(12) United States Patent
Zeng

(10) Patent No.: US 10,826,645 B2
(45) Date of Patent: Nov. 3, 2020

(54) METHODS, SYSTEMS, AND COMPUTER READABLE MEDIA FOR UTILIZING A JAMMING-RESISTANT RECEIVER DEVICE

(71) Applicant: University of Louisville Research Foundation, Inc., Louisville, KY (US)

(72) Inventor: Huacheng Zeng, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 0 days.

(21) Appl. No.: 16/369,758

(22) Filed: Mar. 29, 2019

(65) Prior Publication Data

US 2019/0363820 A1 Nov. 28, 2019

Related U.S. Application Data

(60) Provisional application No. 62/650,015, filed on Mar. 29, 2018.

(51) Int. Cl.
*H04K 3/00* (2006.01)
*H04W 88/02* (2009.01)
*G06F 17/11* (2006.01)

(52) U.S. Cl.
CPC ............ *H04K 3/228* (2013.01); *G06F 17/11* (2013.01); *H04K 3/255* (2013.01); *H04W 88/025* (2013.01)

(58) Field of Classification Search
CPC ........ H04K 3/228; H04K 3/255; G06F 17/11; H04W 88/025
USPC .......................................................... 455/1
See application file for complete search history.

(56) References Cited

U.S. PATENT DOCUMENTS

| 2007/0291866 | A1* | 12/2007 | Rajappan | ............. | H04B 7/0413 375/267 |
| 2010/0040178 | A1* | 2/2010 | Sutton | .................. | H04B 7/0845 375/345 |

OTHER PUBLICATIONS

T. Tang and R. W. Heath, Jr., "A Direct Training-based Method for Joint Space-Time Interference Cancellation in MIMO-OFDM Systems," Proc. IEEE GLOBECOM 2004 (Year: 2004).*

(Continued)

*Primary Examiner* — Yuwen Pan
*Assistant Examiner* — Angelica M Perez
(74) *Attorney, Agent, or Firm* — Jenkins, Wilson, Taylor & Hunt, P.A.

(57) ABSTRACT

A method for utilizing a jamming-resistant receiver (JrRx) device includes receiving, by a BJM engine, a plurality of individual subcarrier signals that comprises separate signal portions of a combined signal stream, wherein the combined signal stream is a combination formed by a source signal stream from a sender device and one or more interfering jamming signals from a plurality of unknown jammer devices and computing, by the BJM engine, a respective plurality of BJM filters for the plurality of individual subcarrier signals in the absence of channel information corresponding to the interfering jamming signals. The method further includes applying, by the BJM engine, the plurality of BJM filters to the respective plurality of individual subcarrier signals to decode data packets of the plurality of individual subcarrier signals in order to produce a plurality of source signal stream portions as decoded output, and recovering, by the BJM engine, the source signal stream by combining the decoded output from each of the plurality of BJM filters.

20 Claims, 27 Drawing Sheets

(56) References Cited

OTHER PUBLICATIONS

Zeng et al., "Enabling Jamming-Resistant Communications in Wireless MIMO networks", 2017 IEEE Conference on Communications and Network Security, pp. 9, 2017 (Year: 2017).*
Awoseyila et al., "Robust time-domain timing and frequency synchronization for OFDM systems," IEEE Trans-actions on Consumer Electronics, vol. 55, No. 2 (2009).
Blossom, "GNU radio: Tools for exploring the radio frequency spectrum," Linux journal, vol. 2004, No. 122, p. 4 (2004).
Ettus Research, "USRP N210," www.ettus.com/product/details/UN210-KIT [Online; accessed Mar. 8, 2017].
Gollakota et al., "Clearing the RF smog: Making 802.11n robust to cross-technology interference," in ACM SIGCOMM, vol. 41, pp. 170-181 (2011).
Hanawal et al., "Joint adaptation of frequency hopping and transmission rate for anti-jamming wireless systems," IEEE Transactions on Mobile Computing, vol. 15, No. 9, pp. 2247-2259 (2016).
Jin et al., "Zero pre-shared secret key establishment in the presence of jammers," in ACM MobiHoc, pp. 219-228 (2009).
Liu et al., "Defending DSSS-based broadcast communication against insider jammers via delayed seed-disclosure," in ACM ACSAC, pp. 367-376 (2010).
Liu et al., "Randomized differential DSSS: Jamming-resistant wireless broadcast communication," in IEEE INFO-COM, pp. 1-9 (2010).
Navda et al., "Using channel hopping to increase 802.11 resilience to jamming attacks," in IEEE INFOCOM, pp. 2526-2530 (2007).
Shen et al., "Ally friendly jamming: How to jam your enemy and maintain your own wireless connectivity at the same time," in IEEE Symposium on Security and Privacy, pp. 174-188 (2013).
Strasser et al., "Jamming-resistant key establishment using uncoordinated frequency hopping," in IEEE Symposium on Security and Privacy, pp. 64-78 (2008).
Vo-Huu et al., "Counter-jamming using mixed mechanical and software interference cancellation," in ACM WiSec, pp. 31-42 (2013).
Wang et al., "Delay-bounded adaptive UFH-based anti-jamming wireless communication," in IEEE INFOCOM, pp. 1413-1421 (2011).
Wu et al., "Maximum-likelihood symbol synchronization for ieee 802.11a wlans in unknown frequency-selective fading channels," IEEE Transactions on Wireless Communications, vol. 4, No. 6, pp. 2751-2763 (2005).
Xu et al., "Channel surfing and spatial retreats: Defenses against wireless denial of service," in ACM Workshop on Wireless security, pp. 80-89 (2004).
Xu et al., "The feasibility of launching and detecting jamming attacks in wireless networks," in ACM MobiHoc, pp. 46-57 (2005).
Yan et al., "Jamming resilient communication using MIMO interference cancellation," IEEE Transactions on Information Forensics and Security, vol. 11, No. 7, pp. 1486-1499 (2016).

* cited by examiner

802

US 10,826,645 B2

METHODS, SYSTEMS, AND COMPUTER READABLE MEDIA FOR UTILIZING A JAMMING-RESISTANT RECEIVER DEVICE

CROSS REFERENCE TO RELATED APPLICATION

This application is based on and claims priority to U.S. Provisional Patent Application Ser. No. 62/650,015, filed Mar. 29, 2018, the disclosure of which is incorporated by reference herein in its entirety.

TECHNICAL FIELD

The subject matter described herein relates to wireless communication systems. More particularly, the subject matter described herein relates to methods, systems, and computer readable media for utilizing a jamming-resistant receiver device.

BACKGROUND

As a critical concern of network security, radio jamming attacks in wireless networks have received a large amount of research efforts in the past decades and have produced many insightful results regarding the attack destructiveness and defense mechanisms. Traditional anti-jamming approaches include frequency hopping spread spectrum (FHSS) and direct-sequence spread spectrum (DSSS). However, these approaches are not capable of addressing powerful broadband jamming attacks and also result in an inefficient spectrum utilization.

With the proliferation of wireless devices with multiple antennas, multiple-input and multiple-output (MIMO) has been adopted by the mainstream anti-jamming solutions to salvage legitimate communications in jamming environments through spatial jamming mitigation at the authorized users. For example, interference cancellation solutions have been developed to enable Wi-Fi communications in the presence of jamming signals from home devices, such as a microwave oven and a baby monitor. A counter-jamming solution has also been developed by combining mechanical antenna reconfiguration and digital signal processing. Similarly, an anti-jamming mechanism to defend against reactive jammer attacks in Wi-Fi communications has been proposed. However, the existing MIMO-based anti-jamming solutions greatly depend on the availability of accurate jamming channel information (e.g., channel ratio), which is difficult to estimate in real-world wireless systems due to the lack of knowledge of jamming signals. Therefore, the existing M IMO-based anti-jamming solutions are not amenable to practical implementation in real-world wireless systems, especially in multi-jammer environments.

SUMMARY

This Summary lists several embodiments of the presently disclosed subject matter, and in many cases lists variations and permutations of these embodiments of the presently disclosed subject matter. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this Summary or not. To avoid excessive repetition, this Summary does not list or suggest all possible combinations of such features.

In some embodiments, the presently disclosed subject matter includes a method for utilizing a jamming-resistant receiver (JrRx) device includes receiving, by a BJM engine, a plurality of individual subcarrier signals that comprises separate signal portions of a combined signal stream, wherein the combined signal stream is a combination formed by a source signal stream from a sender device and one or more interfering jamming signals from a plurality of unknown jammer devices and computing, by the BJM engine, a respective plurality of BJM filters for the plurality of individual subcarrier signals in the absence of channel information corresponding to the interfering jamming signals. The method further includes applying, by the BJM engine, the plurality of BJM filters to the respective plurality of individual subcarrier signals to decode data packets of the plurality of individual subcarrier signals in order to produce a plurality of source signal stream portions as decoded output, and recovering, by the BJM engine, the source signal stream by combining the decoded output from each of the plurality of BJM filters.

In some embodiments, the presently disclosed subject matter also provides a jamming-resistant receiver (JrRx) device comprising at least one processor and memory. The JrRx device further includes a blind jamming mitigation (BJM) engine stored in the memory and when executed by the at least one processor is configured for receiving a plurality of individual subcarrier signals that comprises separate signal portions of a combined signal stream, wherein the combined signal stream is a combination formed by a source signal stream from a sender device and one or more interfering jamming signals from a plurality of unknown jammer devices, computing a respective plurality of BJM filters for the plurality of individual subcarrier signals in the absence of channel information corresponding to the interfering jamming signals, applying the plurality of BJM filters to the respective plurality of individual subcarrier signals to decode data packets of the plurality of individual subcarrier signals in order to produce a plurality of source signal stream portions as decoded output; and recovering the source signal stream by combining the decoded output from each of the plurality of BJM filters.

The subject matter described herein may be implemented in hardware, software, firmware, or any combination thereof. As such, the terms "function", "module" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

An object of the presently disclosed subject matter having been stated herein above, and which is achieved in whole or in part by the presently disclosed subject matter, other objects will become evident as the description proceeds when taken in connection with the accompanying drawings as best described herein below.

DETAILED DESCRIPTION

Figure 1:
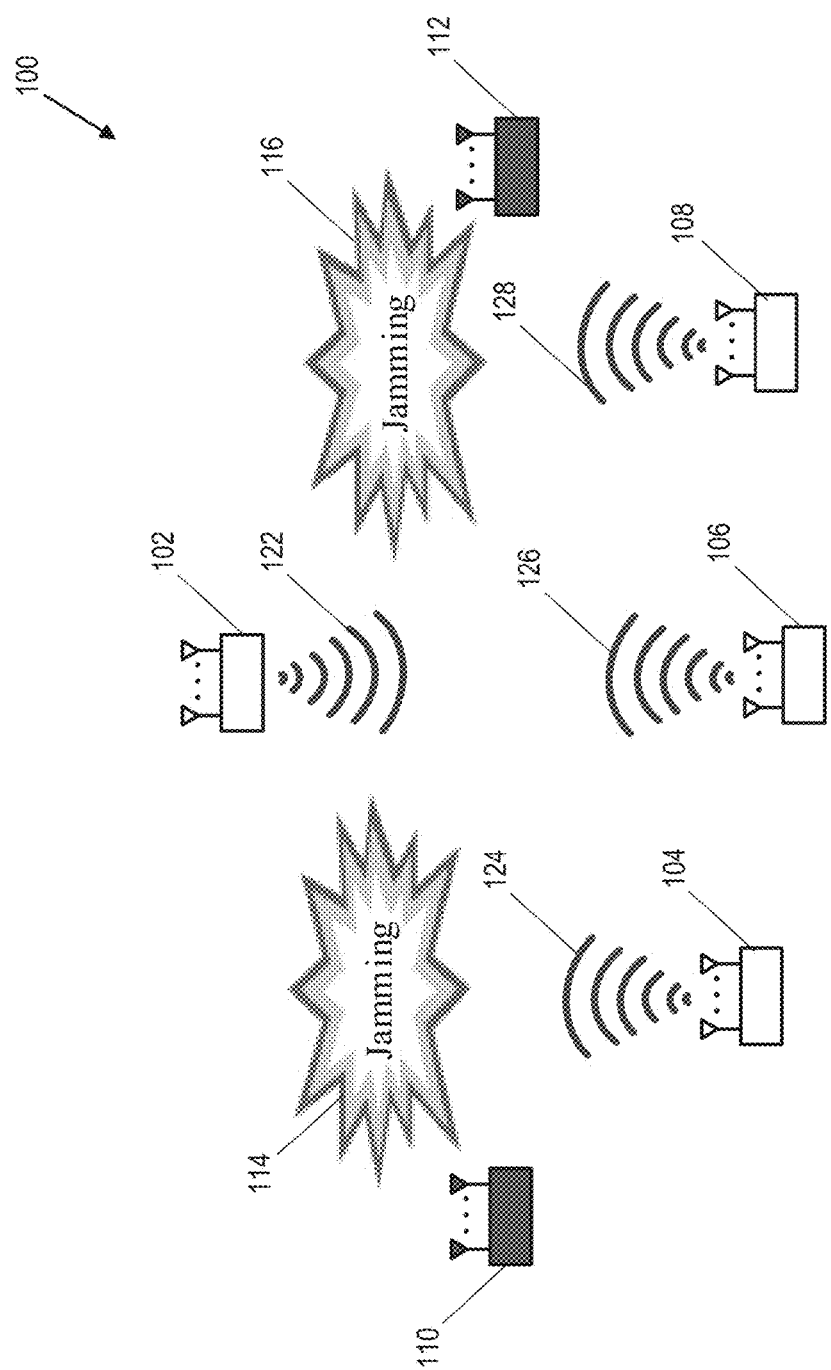
FIG. 1 is a block diagram illustrating an exemplary wireless network that is subjected to jamming attacks.

The disclosed subject matter presents a practical anti-jamming solution to salvage legitimate communications in wireless networks with multiple high-power and broadband radio jammers by leveraging MIMO signal processing techniques at the physical (PHY) layer, and evaluate the disclosed solution on a wireless testbed consisting of USRP2 and GNURadio. In some embodiments, a blind jamming mitigation (BJM) algorithm is utilized and be configured to, cancel the jamming signals from unknown jammers and recover the desired signals from a legitimate sender. Unlike other jamming mitigation algorithms that rely on the availability of accurate jamming channel ratio, the BJM algorithm does not require any channel knowledge for jamming mitigation and signal recovery.

Based on the BJM algorithm, a jamming-resistant receiver (termed JrRx) has been configured to decode data packets from a legitimate sender in the face of interfering signals from multiple unknown jammers. In some embodiments, JrRx includes two key modules: a jamming-resilient synchronization module and a BJM module. The core of each module is a linear spatial filter. Notably, JrRx is characterized by low complexity (e.g., linear operations without iterative decoding) and is therefore suited for practical use. Based on JrRx, a holistic anti-jamming scheme has been implemented to enable legitimate communications in wireless networks, such as Wi-Fi networks, cellular networks, and/or other orthogonal frequency divisional multiplexing (OFDM) networks, when attacked by multiple jammers. Notably, although the following description may describe the JrRx receiver and/or the use of the BJM algorithm in the context of a Wi-Fi network or Wi-Fi transmissions/communications, it is understood that the following description pertains to any OFDM wireless network or communications without deviating from the scope of the disclosed subject matter.

In some embodiments, JrRx may be implemented by using GNURadio-USRP2 in a Wi-Fi network with multiple jammers. Unlike prior works that use the packet delivery rate as the performance metric, the disclosed matter utilizes the post signal-to-jamming-plus-noise ratio (pSJNR) of a decoded signal symbols to evaluate the performance of the JrRx. Since pSJNR determines the raw bit error rate (e.g., raw BER, BER without channel code), it is more accurate to qualify the jamming mitigation capability of the disclosed subject matter. Experimental results show that (i) JrRx is robust to various jamming signals (e.g., full-spectrum jamming, half-spectrum jamming, single-frequency jamming, and rectangular-waveform jamming) and (ii) a JrRx device that is equipped with more antennas than the jammers, it can successfully decode the signals from the sender, even in the scenarios where the jamming signals are 20 dB stronger than the desired signals.

The disclosed anti-jamming solution advances the state-of-the-art in the following aspects: (i) unlike the prior solutions that require jamming channel ratio, the disclosed subject matter does not require any channel knowledge, thereby making it suitable for practical use, (ii) the disclosed subject matter solution can be used in both jamming and non-jamming scenarios, thereby eliminating the requirement of jamming detection, (iii) the disclosed subject matter solution is a holistic solution, which includes not only jamming mitigation but also jamming-resilient synchronization and carrier sensing components, and (iv) the disclosed subject matter can tackle multiple high-power broadband jamming attacks in real-world systems. Notably, this is the first practical anti-jamming solution that can handle multiple high-power broadband jamming attackers.

FIG. 1 is a block diagram illustrating an exemplary wireless network 100 that is subjected to jamming attacks. For example, wireless network 100 includes an access point (AP) 102 in communication with a group of wireless user devices 104-108. In some embodiments, wireless network 100 can include any orthogonal frequency divisional multiplexing network (OFDM) network, such as a Wi-Fi network, a cellular network, or the like. For example, the data transmissions sent by wireless user devices 104-108 may be conducted via OFDM modulation at the physical (PHY) layer, which is the case in most Wi-Fi networks (e.g., 802.11 ac and ax), for example. Each wireless user device 102-108 is equipped with multiple antennas. Carrier sense multiple access (CSMA) or its variation can be used as the media access control (MAC) protocol to control the media access among the wireless user devices 104-108.

In wireless network 100, there can exist one or more radio jamming devices 110-112 (e.g., "jammers"). The jamming devices 110-112 intentionally emit radio jamming signals into the air with the aim of disrupting the legitimate communications in wireless network 100. In some embodiments, a number of assumptions on the jamming attacks can be made. First, wireless user devices 102-108 have no knowledge of jamming devices 110-112 or the jamming signals 114-116 transmitted by jamming devices 110-112. This includes the number of jamming devices 110-112, the bandwidth and power of jamming signals 114-116, and the waveform of jamming signals 114-116. Second, the bandwidth of jamming signals 114-116 can be larger than, equal to, or less than the bandwidth of legitimate signals 122-128. Notably, the spectrum of jamming signals 114-116 can either fully or partially overlap with the spectrum of legitimate signals 122-128. Third, jamming signals 114-116 can be any waveform (e.g., OFDM signals, single-frequency signals, rectangular-waveform signals, and noise-like signals). Further, these waveforms of jamming signals 114-116 may vary over time. A fourth assumption is that the power of jamming signals 114-116 can be much larger than the power of legitimate signals 122-128 (e.g., 20 dB stronger). Lastly, each jamming device 110-112 can be a constant jammer (e.g., constantly emitting jamming signals), a random jammer (e.g., randomly emitting jamming signals), or a reactive jammer (e.g., intermittently emitting jamming signals). In addition to the above assumptions for the jamming attacks, the following assumptions for wireless user devices 104-108 can also be made. Notably, the number of antennas at each wireless user device 104-108 is greater than or exceeds the total number (or sum) of antennas at all jamming devices 110-112. Although the following description may describe 'jamming signals' and/or 'jamming devices' as examples, it is understood that this disclosure pertains to any wireless OFDM based interference signal that interferes or "jams" a legitimate source signal from a sending device without deviating from the scope of the disclosed subject matter. Notably, the jamming signal described herein may be any 'interference signal' that originates from an "interfering device" that transmits a wireless signal that inadvertently conflicts or interferes with the legitimate source signal from the sending device. For example, the disclosed subject matter would operate the same (e.g., cancel the interference signal(s) and recover the source signal) regardless of whether the interference/jamming signal was generated with the intent to jam/interfere with the original source signal or not.

In some embodiments, the disclosed subject matter includes a BJM algorithm implemented in a jamming-resistant receiver (JrRx) device. As such, the JrRx device can enable successful communications in the presence of multiple jammers as shown in FIG. 1. In some embodiments, the JrRx device may be implemented using GNURadio-USRP2 wireless testbed and evaluate its performance using experimental results.

Figure 2:
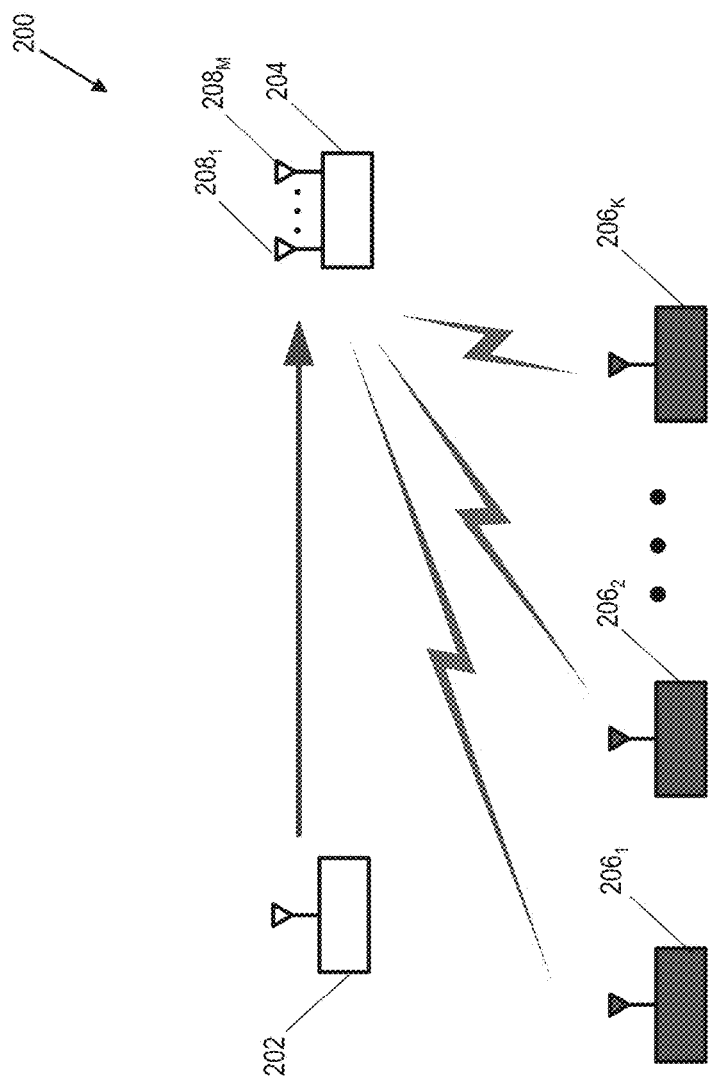
FIG. 2 is a block diagram illustrating an exemplary signal jamming model according to an embodiment of the subject matter described herein.

FIG. 2 is a block diagram illustrating an exemplary signal jamming model according to an embodiment of the subject matter described herein. Namely, FIG. 2 illustrates a wireless network 200 that includes one single-antenna sender device 202, one M-antenna receiver device 204, and K single-antenna jammer devices $206_{1 \ldots K}$. Network 200 can be denoted as N (1, K, M). In network 200, the number of antennas $208_{1 \ldots M}$ on the receiver device 204 is assumed to be is greater than the total number of antennas on the single-antenna jammer devices $206_{1 \ldots K}$, i.e., M>K.

BJM in Narrow Band Network

In some embodiments, the developed BJM algorithm can be utilized in a narrow-band network. Namely, the process/algorithm described in this section can be implemented by a blind jamming mitigation (BJM) engine (e.g., a BJM algorithm, module, and/or executable software) that is stored in memory and executed by one or more processors of a JrRx device (e.g., receiver device 204). Additional details regarding the BJM engine and JrRx device is described in greater detail below.

In some embodiments, $H_j$ is denoted as the channel coefficient between the sender device's antenna and the receiver device's jth antenna. $G_{jk}$ is denoted as the channel coefficient between the antenna of the kth jammer device (e.g., jammer device $206_k$) and the jth antenna of receiver device 204. Further, X can be denoted as the original signal (e.g., the source signal) at the sender device 202 and $Z_k$ is denoted as the jamming signal at the kth jammer $206_k$. At receiver device 204, $Y=[Y_1, Y_2, \ldots, Y_M]^T$ is denoted as the received signal vector, with Y being the signal from its jth antenna, while $W=[W_1, W_2, \ldots, W_M]^T$ is denoted as the noise vector, with $W_j$ being the noise from its jth antenna. Accordingly, $Y_j$ may be calculated as:

$$Y_j = H_j X + \sum_{k=1}^{K} G_{jk} Z_k + W_j, \quad 1 \le j \le M$$

At receiver device 204, a linear spatial filter is employed to decode the signal from sender device 202 in the presence of jamming signals. Here, the linear spatial filter may refer to a set of complex weights that can be used to combine the signal streams from different antennas at receiver device 204. In some embodiments, P is denoted as the linear spatial filter (e.g., a M×1 complex vector) and g is denoted as the decoded (e.g., estimated) signal. Accordingly, $$\hat{X} = P^H Y$$

where the $(\cdot)^H$ operator represents the conjugate transpose. Based on the above definition, the mean squared error (MSE) can be written as:

$$\text{MSE} = \mathbb{E}[|\hat{X}-X|^2] = \mathbb{E}[|P^H Y - X|^2] = P^H \mathbb{E}[YY^H]P + \mathbb{E}[XX^H] - \mathbb{E}[P^H YX^H] - \mathbb{E}[XY^H P],$$

where $\mathbb{E}(\cdot)$ represents the statistical expectation operator. Notably, the above equation is actually a quadratic function of P. To minimize MSE, the gradient can be taken with respect to P. The optimal filter P can be obtained by setting the gradient to zero, which can be shown as follows:

$$\frac{\partial \text{MSE}}{\partial P} = 2\mathbb{E}[YY^H]P - 2\mathbb{E}[YX^H]$$

By setting $$\frac{\partial \text{MSE}}{\partial P}$$

to zero, an optimal filter can be obtained by:

$$P = \mathbb{E}[YY^H]^\dagger \mathbb{E}[YX^H]$$

where the $(\cdot)^\dagger$ operator represents the pseudo-inverse.

Notably, this equation represents the optimal design of P. To estimate $\mathbb{E}[YY^H]$ and $\mathbb{E}[YX^H]$ in $P = \mathbb{E}[YY^H]^\dagger \mathbb{E}[YX^H]$, the pilot signals (e.g., preamble or reference symbols) that are widely available in wireless communication systems can be exploited. For example, L can be denoted as the number of pilot signals in the system. Further, $[\tilde{X}(1), \tilde{X}(2), \ldots, \tilde{X}(L)]$ can be denoted as the pilot signals at sender device 202. Likewise, $[\tilde{Y}(1), \tilde{Y}(2), \ldots, \tilde{Y}(L)]$ can be denoted as the received pilot signals at the receiver device 204, which also includes jamming signals. Then, the statistic expectation can be approached using the average operation over a set of pilot signals. Specifically, $\mathbb{E}[YY^H]$ and $\mathbb{E}[YX^H]$ are respectively estimated as follows:

$$\mathbb{E}[YY^H] := \frac{1}{L}\sum_{l=1}^{L} \tilde{Y}(l)\tilde{Y}(l)^H$$

$$\mathbb{E}[YX^H] := \frac{1}{L}\sum_{l=1}^{L} \tilde{Y}(l)\tilde{X}(l)^H$$

where the := operator represents value estimation. It should be noted that $\tilde{Y}(l)$ includes both the pilot signals from sender device 202 and the jamming signals from jammer devices 206. Based on the above formulas for $\mathbb{E}[YY^H]$ and $\mathbb{E}[YX^H]$, the filter P can be represented as:

$$P := \left[\sum_{l=1}^{L} \tilde{Y}(l)\tilde{Y}(l)^H\right]^\dagger \left[\sum_{l=1}^{L} \tilde{Y}(l)\tilde{X}(l)^H\right]$$

where the superscript dagger symbol is a pseudo-inverse operator, $\tilde{X}(l)$ is the pilot signals (e.g., reference signals) at the legitimate sender (e.g., sender device 202) and $\tilde{Y}(l)$ is the received signal vector at the receiver (e.g., receiver device 204). Note that $\tilde{Y}(l)$ includes signals from the legitimate sender device and the interference signals originating from the jammer devices.

In some embodiments, an "Algorithm 1" can be embodied as an BJM algorithm that executed by a BJM engine and may comprise two steps. The first step includes (i) the receiver device and/or BJM engine computing a complex vector P using $P = [\sum_{l=1}^{L} \tilde{Y}(l)\tilde{Y}(l)^H]^\dagger [\sum_{l=1}^{L} \tilde{Y}(l)\tilde{X}(l)^H]$. The second step includes (ii) the receiver device employ the resulting complex vector P to decode the desired signals by: $\hat{X} = P^H Y$.

It is worth noting that the spatial filter P in $P = [\sum_{l=1}^{L} \tilde{Y}(l)\tilde{Y}(l)^H]^\dagger [\sum_{l=1}^{L} \tilde{Y}(l)\tilde{X}(l)^H]$ has two functionalities: jamming mitigation and channel equalization. Namely, the filter P not only mitigates the jamming signals, but the filter also equalizes the channel to recover the desired source signal from the sender device 202.

In some embodiments, filter P as calculated above is the core of the BJM algorithm that is executed by a BJM engine. For example, as can be seen from $P = [\sum_{l=1}^{L} \tilde{Y}(l)\tilde{Y}(l)^H]^\dagger [\sum_{l=1}^{L} \tilde{Y}(l)\tilde{X}(l)^H]$, the BJM algorithm executed by the BJM engine requires no knowledge of the jamming signals and/or the jamming devices. The BJM algorithm only needs to have knowledge of the pilot (and/or reference) signals at the sender device 202. Due to these special properties, the BJM engine and/or the BJM algorithm is particularly suitable for jamming mitigation in practice.

From the derivation of P, the BJM algorithm can guarantee to yield the minimum MSE existing between the estimated and original signals. If the sender device 202 has sufficient pilot (reference) signals, then the following lemmas regarding the performance of the BJM algorithm can be assumed to be true. For example, in Lemma 1, it can be assumed that in noise-negligible scenarios, the BJM algorithm can (i) completely cancel jamming signals and (ii) perfectly recover the desired source signal originating from the sender device.

As proof for this lemma, consider network 200 in FIG. 2. Notably, H can be denoted as the compound channel matrix between the transmitters (e.g., sender device 202 and jammer devices $206_{1 \ldots K}$) and the receiver device 204, which is a M×(1+K) complex matrix. The first column of H is the channel vector between the sender device 202 and the receiver device 204 and the (k+1)th column of H is the channel vector between the kth jammer device 206 and the receiver device 204 (for 1≤k≤K). Further, X can be denoted as the compound transmit signals at all transmitters (e.g., sender device and jammer devices), i.e., $X=[X, Z_1, Z_2, \ldots, Z_K]^T$. Then, the received signal vector at the receiver device 204 can be written as $Y=HX+W=HX$, where the second equation follows from the assumption that the noise is negligible.

When the sender device 202 has a sufficient number of pilot signals, the above formulas for P are equivalent. For example:

$$P = \mathbb{E}[YY^H]^\dagger \mathbb{E}[YX^H] = [HR_X H^H]^\dagger [HD_X]$$

where $R_x$ is X's autocorrelation matrix and $D_X=[\sigma_X^2, 0, 0 \ldots, 0]$ with $\sigma_X^2$ being X's variance.

$$\hat{X} = P^H Y = P^H HX = ([HR_X H^H]^\dagger [HD_X])^H HX =$$
$$(H^H [HR_X H^H]^\dagger [HD_X])^H X = [1\ 0\ \ldots\ 0]X = X.$$

Recall that $\hat{X}$ represents the estimated signal at the receiver device 204 and X is the original signal at the sender device 202. The above equation indicates that the jamming signals can be completely cancelled by the BJM engine, and the desired source signal from sender device 202 can be perfectly recovered.

In some embodiments, Lemma 1 demonstrates the superior performance of the BJM algorithm and/or BJM engine in noise-negligible scenarios. In the scenarios where the noise is not negligible, it is difficult to analytically qualify the performance of the BJM algorithm. Hence, simulation can be utilized in these instances.

Figure 3A:
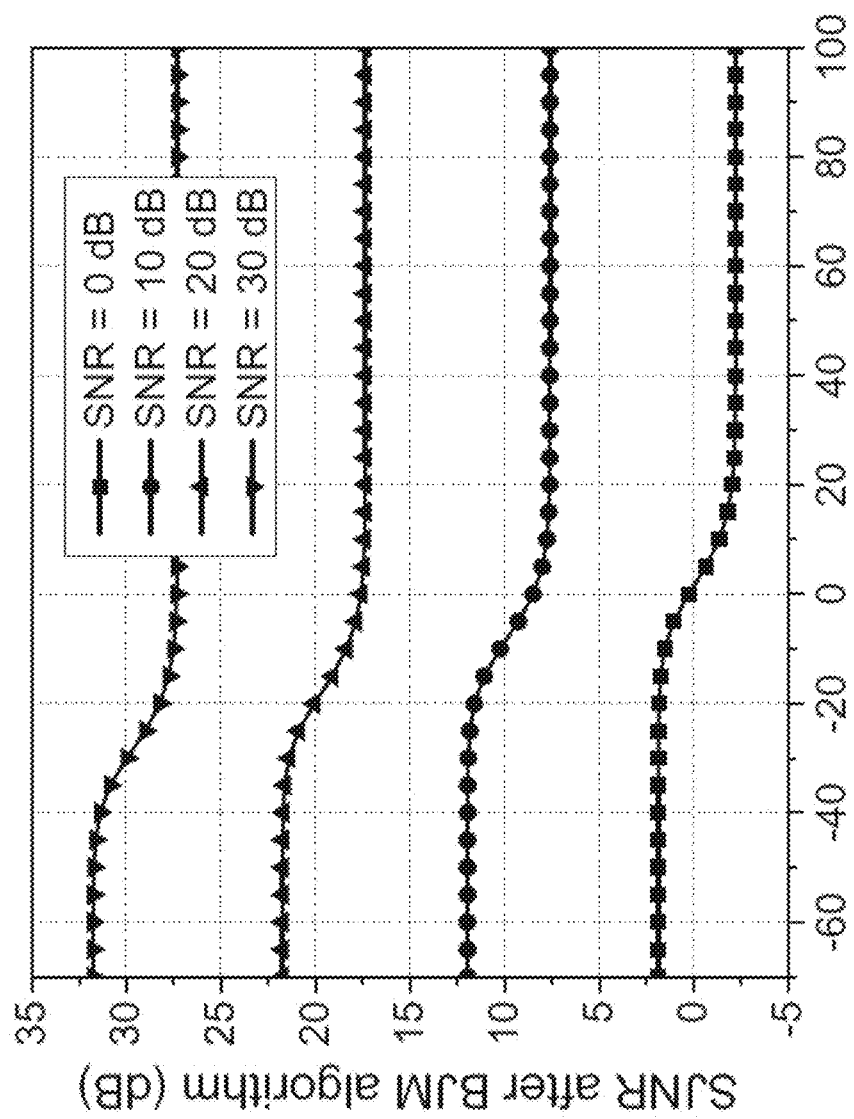
FIG. 3A-3B are graphs illustrating the performance of the BJM algorithm in various wireless network according to an embodiment of the subject matter described herein.
Figure 3B:
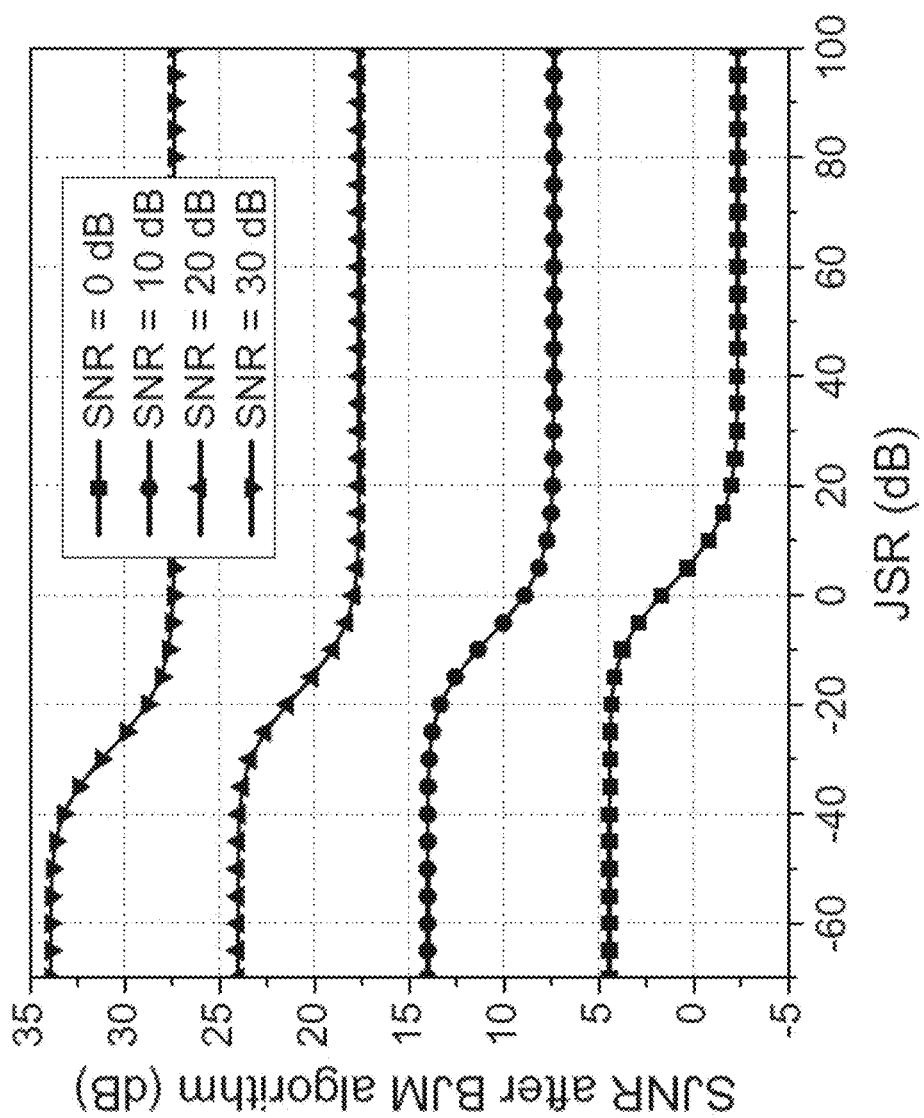

FIG. 3A-3B are graphs illustrating the performance of the BJM algorithm in various wireless network according to an embodiment of the subject matter described herein. For example, FIG. 3A illustrates a graph 302 that depicts the performance of the BJM algorithm in a N(1, 1, 2) network. Likewise, FIG. 3B illustrates a graph 304 that depicts the performance of the BJM algorithm in a N(1, 2, 3) network. In each of FIGS. 3A and 3B, the x-axis represents the jamming-to-signal ratio (JSR) before the application of BJM processing and the y-axis represents the signal-to-jamming-plus-noise ratio (SJNR) after BJM processing. Notably, in all of the noise scenarios (e.g., SNR 0 dB, 10 dB, 20 dB, or 30 dB) when the JSR increases from −60 dB to 100 dB, the SJNR degradation is less than 5 dB in N(1, 1, 2) as shown in graph 302 of FIG. 3A and less than 7 dB in N(1, 2, 3) as shown in graph 304 of FIG. 3B. This data indicates that the BJM algorithm is extremely effective in jamming mitigation in each of a low, mid-, and high-SNR scenario.

In some embodiments, the BJM algorithm involves matrix multiplication and pseudo-inverse manipulations. All of these manipulations are linear operations. In some embodiments, the dimension of the matrix includes the number of antennas at the receiver, which is typically small (e.g., less than or equal to eight in 802.11ac). Thus, the complexity of the BJM algorithm is very low and acceptable in real-world wireless systems.

BJM Algorithm in OFDM-MIMO Broadband Network

The disclosed BJM algorithm was developed based on the simplified jamming model illustrated in FIG. 2, where each sender device 202 and jammer device 206 has a single antenna. In contrast, FIG. 4 demonstrates a scenario where the BJM engine and/or BJM algorithm can be used in a MIMO network 400 that includes a sender device 402 comprising a plurality of antennas $410_{1 \ldots Q}$ and receiver device 404 comprising a plurality of antennas $408_{1 \ldots M}$. MIMO network 400 further includes a plurality of jammer devices $406_{1 \ldots K}$ that may similarly comprise multiple antennas $412_{1 \ldots N}$. In some embodiments where the sender device 402 has multiple antennas $410_{1 \ldots Q}$, sender device 402 may use its multiple antennas $410_{1 \ldots Q}$ for spatial diversity and send one data stream to receiver device 404. This diversity mode is supported by all Wi-Fi standards. In this mode, sender device 402 with multiple antennas $410_{1 \ldots Q}$ can be viewed as a sender with a single combined antenna according to the MIMO theory. Therefore, the BJM algorithm can be used by a BJM engine in MIMO network 400 where the sender device has multiple antennas. Likewise, one or more of jammer devices $406_{1 \ldots K}$ can include multiple antennas. In the context of blind jamming mitigation, a jammer device 406 with N antennas can be treated as N independent single-antenna jammers. Therefore, the BJM algorithm executed by a BJM engine can be used in MIMO network 400 where each jammer device has multiple antennas. As such, as long as the number of antennas at a wireless user device (e.g., the receiver device 404) is greater than the total number of antennas at jammer devices $406_{1 \ldots K}$, the receiver device 404 can successfully decode the signals from the multi-antenna sender device 402.

Figure 4:
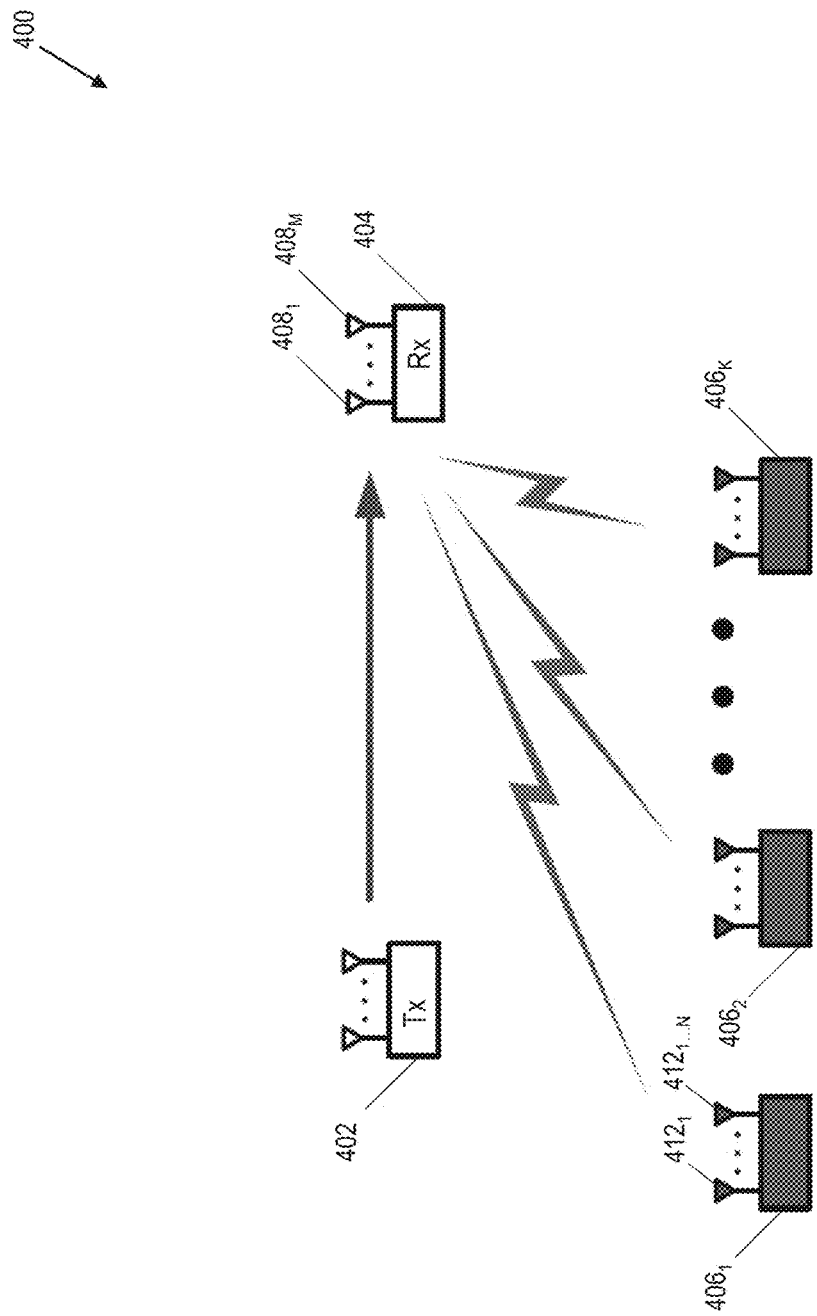
FIG. 4 is a block diagram illustrating an exemplary signal jamming model in a multiple-input and multiple-output (MIMO) network according to an embodiment of the subject matter described herein.

In order to support high-rate data transmission in a broadband MIMO-OFDM network (e.g., MIMO network 400 as shown in FIG. 4), the broadband channel is divided by the JrRx device into many narrow-band channels using OFDM modulation. For example, each OFDM subcarrier (e.g., a radio frequency subcarrier wave) corresponds to a narrow-band channel. To handle the jamming attacks in a broadband network, the BJM algorithm (as specified in "Algorithm 1") is applied to each of the OFDM subcarriers. Specifically, for the signals on each individual subcarrier, a BJM engine can be configured to utilize $P=[\sum_{l=1}^{L} \tilde{Y}(l)\tilde{Y}(l)^H]^\dagger [\sum_{l=1}^{L} \tilde{Y}(l)\tilde{Y}(l)^H]$ to compute the subcarrier's BJM filter and then use $\hat{X}=P^H Y$ to decode its desired signal at the receiver.

Figure 5:
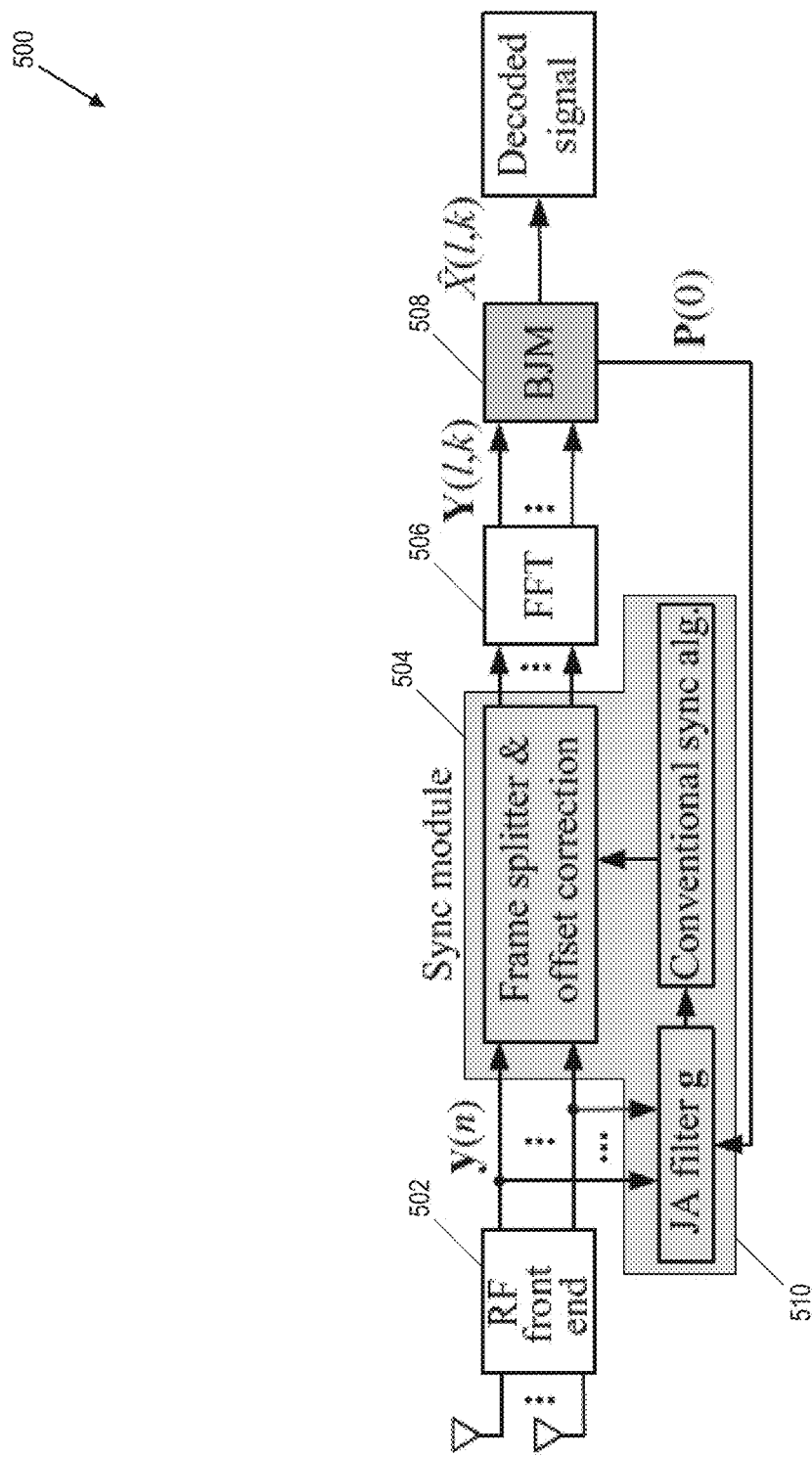
FIG. 5 is a block diagram of an exemplary architecture of a jamming-resistant receiver (JrRx) device according to an embodiment of the subject matter described herein.

FIG. 5 is a block diagram of an exemplary architecture of a jamming-resistant receiver (JrRx) device according to an embodiment of the subject matter described herein. Based on the BJM algorithm and/or BJM engine, a JrRx device that decodes its desired signals in the presence of jamming signals can be designed. For example, FIG. 5 shows the architecture of a JrRx device 500, which includes a radio frequency (RF) front-end component 502, a synchronization engine 504, a fast Fourier transform (FFT) module 506, and a BJM engine 508. Compared to a typical multi-antenna receiver, JrRx device 500 does not need any hardware based modifications. The JrRx device 500 instead needs a baseband signal processing algorithm upgrade. As shown in FIG. 5, JrRx device 500 includes comprises at least a synchronization engine 504 and the BJM engine 508. In some embodiments, BJM engine 508 is configured to construct or generate one or more BJM filters for a respective one or more subcarriers. For example, the BJM filter (e.g., a vector of complex numbers) can be generated by the BJM engine 508 using $P=[\sum_{l=1}^{L} \tilde{Y}(l)\tilde{Y}(l)^H]^\dagger [\sum_{l=1}^{L} \tilde{Y}(l)\tilde{Y}(l)^H]$. Notably, each constructed BJM filter can be used (e.g., applied by BJM engine 508) on each individual subcarrier to mitigate jamming or interference signals in such a manner that the desired source signal from the sender is recovered at the JrRx device. The BJM filter is directly calculated by BJM engine 508 using the interfered reference signals in the data packet. The calculation by BJM engine 508 of the BJM filter on a subcarrier may use the reference signals on that subcarrier and on its neighboring subcarriers. Notably, the calculation of BJM filters by BJM engine 508 does not require the knowledge of the channels between the sender/jammers and the receiver.

In some embodiments, synchronization engine 504 in JrRx device 500 has two functionalities: timing synchronization and frequency synchronization. Timing synchronization includes searching by engine 504 for the start of each frame by exploiting auto or cross correlation of the signal stream in the time domain. Likewise, frequency synchronization can be conducted by engine 504, which can estimate and correct the frequency offset between a sender device and a receiver device.

Notably, performing synchronization can be challenging for engine 504 in JrRx device 500 since synchronization is conducted in the presence of jamming signals. As shown in FIG. 5, the synchronization approach conducted by synchronization engine 504 (which may be executed by a JrRx device) may comprise three steps: (i) designing a spatial jamming-alleviation (JA) filter 510 (e.g., denoted as g) to alleviate the jamming signals for the time-domain signal streams, (ii) employing various methods to estimate/correct the time and frequency offset over the jamming-alleviated signal stream, and (iii) splitting the signal streams into individual frames and compensate for their frequency offset. In this approach, JA filter 510 (e.g., filter g) is a M×1 complex vector and is a primary component. JA filter 510 combines the signal streams from different JrRx's antennas with the aim of alleviating jamming signals by exploiting the spatial degrees of freedom provided by the multiple antennas.

Figure 6:
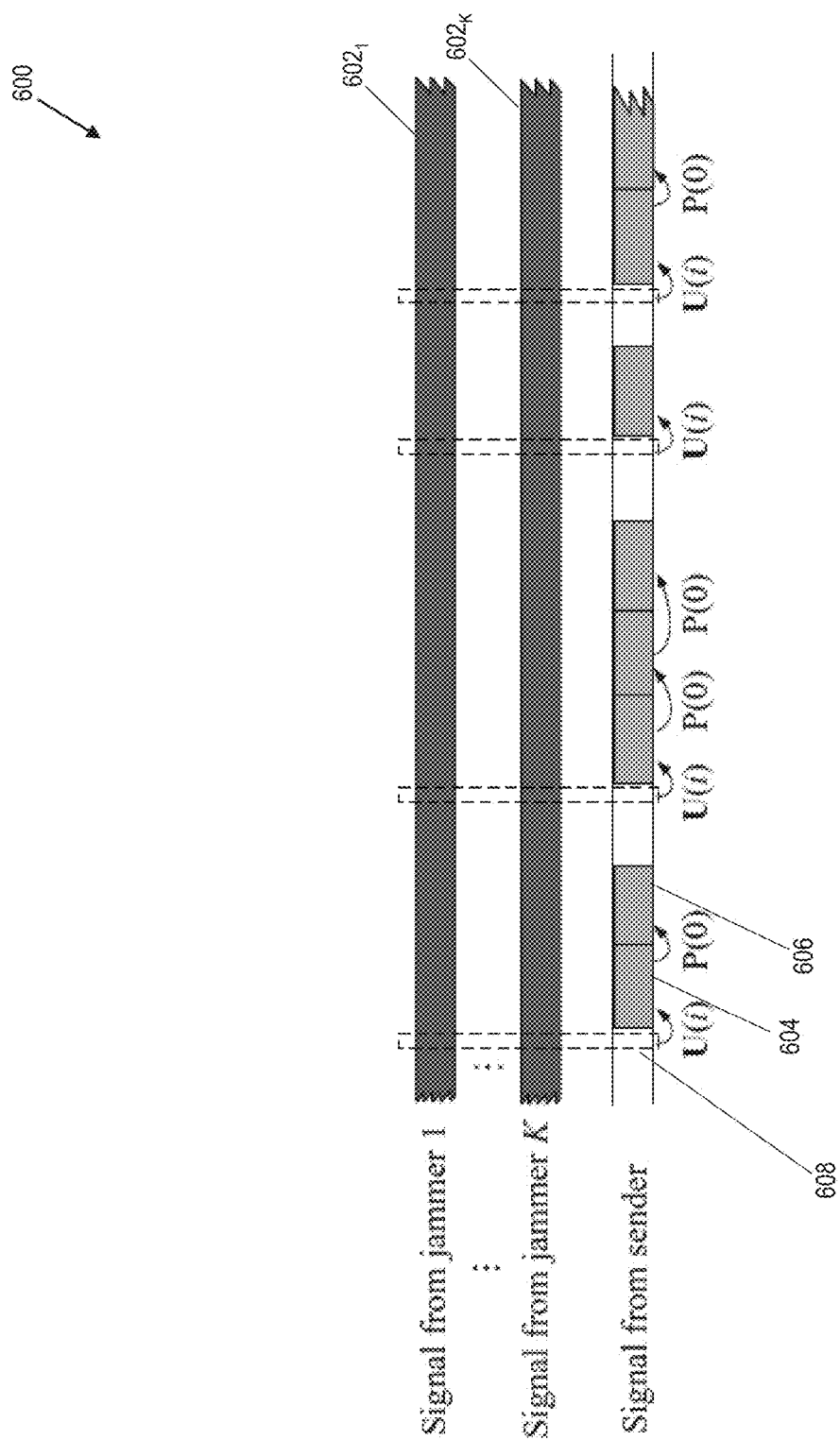
FIG. 6 is a diagram illustrating jamming signals and signal patterns according to an embodiment of the subject matter described herein.

In some embodiments, JrRx device 500 can be configured with different types of filters for JA filter 510. For example, in a first embodiment ('Case I'), the disclosed subject matter may use one of the BJM filters as a JA filter. In some embodiments, the BJM engine can generate a filter for each OFDM subcarrier and the disclosed subject matter may use the centric BJM filter (i.e., P(0)) as the JA filter to alleviate jamming signals in the time domain. To illustrate, reference is now made to FIG. 6, which depicts a diagram 600 illustrating jamming signals 602$_1$ ... $_K$ and OFDM signal patterns according to an embodiment of the subject matter described herein. Notably in FIG. 6, if a frame (e.g., frame 604) was previously found in a given amount of time, the BJM filter is used as the JA filter to alleviate the jamming signals. Specifically, the JA filter is designed by letting a JA filter g (e.g., JA filter 510 in FIG. 5)=P(0), where P(0) is subcarrier 0's BJM filter in the previous frame. Note that subcarrier 0 is the centric subcarrier in their OFDM spectrum. Regarding the performance of this filter, the following Lemma 2 is presented: If the channels between i) a sender/jammer device and ii) a receiver device are frequency-flat and the noise is negligible, then JA filter g=P(0) can completely cancel the jamming signals.

In particular, Lemma 2 shows the efficacy of the JA filter design in an ideal scenario. Although the channels are not frequency-flat, the frequency responses of neighboring OFDM subcarriers are highly correlated in practice. Therefore, filter P(0) can significantly alleviate the jamming signals in the time domain at the receiver device.

In a second case ('Case II'), the disclosed subject matter may use a left-singular vector as a JA filter. Again, referring to diagram 600 in FIG. 6, if a frame was not found in a given amount of time, then a left-singular vector (e.g., vector 608) of the signals is used as the JA filter to alleviate the jamming signals. Specifically, the singular value decomposition (SVD) is conducted as follows:

$$[U \;\; \Sigma \;\; V] = svd\left(\sum_{n=1}^{N_s} y(n)y(n)^H\right)$$

where y(n) is the time-domain signal vector at the receiver device (see e.g., JrRx device 500 in FIG. 5), $N_s$ is the number of signal samples, U is the left complex unitary matrix (M×M). U(i) can be denoted as the ith column of matrix U, which is also known as the ith left-singular vector (e.g., vector 608). For each of the M left-singular vectors in U, the auto/cross correlation of the resulting signal $U(i)^H$ y(t) for $1 \le i \le M$ is measured. Subsequently, the vector that results in the largest correlation value is selected as the JA filter g. In some embodiments, note that the left-singular vectors in the SVD formula above can be replaced with the eigenvector of the signal correlation and the eigenvector will yield the same performance. Regarding the performance of this JA filter, the following Lemma 3 can be formulated: If the channels between sender/jammer and receiver are frequency-flat and the noise is negligible, then there is at least one column of U that can completely cancel jamming signals.

In some embodiments, Algorithm 2 summarizes the disclosed process for designing JA filter 510 (e.g., JA filter g) in FIG. 5, where lines 2-3 of Algorithm 2 (see below) correspond to the first case ('Case I') and lines 5-10 correspond to the second case (e.g., 'Case II') as described above. The worst-case computational complexity of this synchronization algorithm is M times that of a conventional synchronization algorithm. In real-world systems, Case I is dominant and, therefore, the complexity of synchronization module is similar to that of the conventional synchronization algorithm. Notably, the design of a JA filter g for synchronization is detailed in Algorithm 2, which can be represented as:

```
1:   if A frame was found in a given amount of time then
2:       Denote P(k) as subcarrier k's BJM filter in that frame;
3:       g = P(0);
4:   else
5:       Compute the left unitary matrix U using SVD;
6:       for i from 1 to M do
7:           Compute the maximum correlation value of signal
             stream U(i)^H y(n), which we denote as c_i ;
8:       end for
9:       i_m = arg max_{1≤i≤M} {c_i};
10:      g = U(i_m);
11:  end if
```

In some embodiments, the disclosed subject matter may be configured to conduct jamming mitigation and channel equalization. As shown in FIG. 5, once a radio frame has been found and the frequency offset has been corrected, the signal streams are fed to the FFT module 506, which converts each signal stream from the time domain to the frequency domain. For each subcarrier of the resulting frequency-domain signals, the BJM algorithm can be utilized to mitigate jamming signals and equalize the channel distortion. Specifically, for subcarrier k, $P=[\Sigma_{l=1}^L \tilde{Y}(l) \tilde{Y}(l)^H]^\dagger [\Sigma_{l=1}^L \tilde{Y}(l) \tilde{Y}(l)^H]$ is used to compute the subcarrier's BJM filter P(k) and $\tilde{X}=P^H Y$ is used to decode the signal 9($k$).

Figure 7:
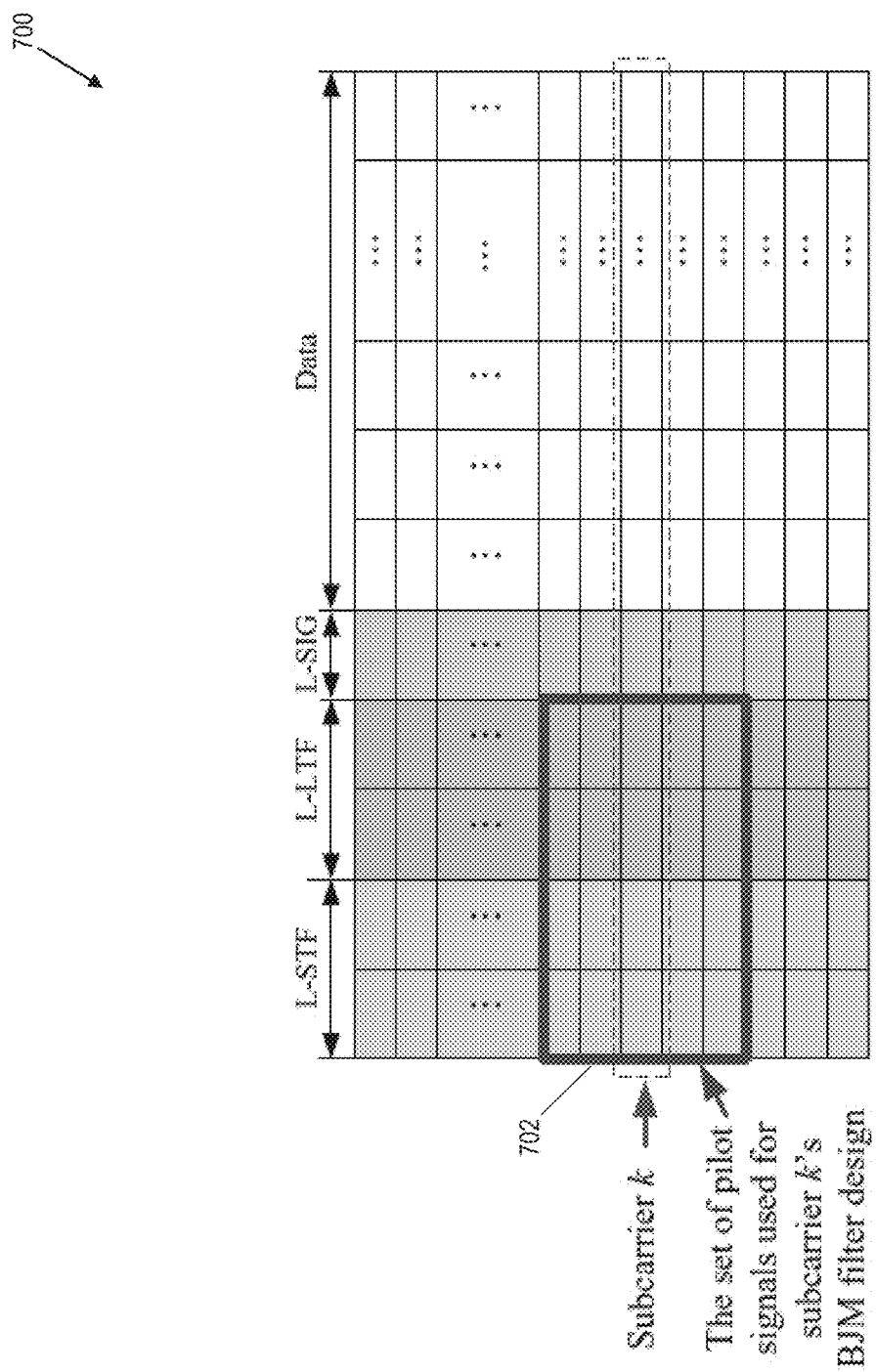
FIG. 7 is a diagram illustrating a legacy Wi-Fi frame structure according to an embodiment of the subject matter described herein.

As indicated in $P=[\Sigma_{l=1}^L \tilde{Y}(l) \tilde{X}(l)^H]^\dagger [\Sigma_{l=1}^L \tilde{Y}(l)(l)^H]$, the design of the BJM filter needs pilot signals (e.g., reference signals). The more pilot signals that are available, the better the BJM filter performs. For each subcarrier, the BJM engine determines which pilot signals in the preamble field of the source signal frame can be used for the BJM filter design. As illustrated in FIG. 7, for the design of subcarrier k's BJM filter, the pilot signals are used not only on that subcarrier but also on that subcarrier's neighboring subcarriers. This is possible because the channels neighboring subcarriers (e.g., subcarriers $708_{k-2}$, $708_{k-1}$, $708_{k+1}$, and $708_{k+2}$) of subcarrier k $708_k$ in FIG. 7 are highly correlated in real-world networks.

In some embodiments, $P_k$ is denoted as the set of pilot signals that are used for subcarrier k's BJM filter design. Based on Wi-Fi's frame structure 700 in FIG. 7, $P_k=\{(l, k'): 1 \leq l \leq 4; k-2 \leq k' \leq k+2\}$, where $1 \leq l \leq 4$ means the pilot OFDM symbols in the L-STF field 704 and L-LTF field 706 (e.g., preamble fields), and $k-2 \leq k' \leq k+2$ means the neighboring two subcarriers. Then, based on $P=[\sum_{l=1}^{L} \tilde{Y}(l)\tilde{X}(l)^H]^\dagger [\sum_{l=1}^{L} \tilde{Y}(l)\tilde{X}(l)^H]$, subcarrier k's BJM filter P(k) can be written as:

$$P(k) = \left[\sum_{(l,k') \in P_k} Y(l, k')Y(l, k')^H\right]^\dagger \left[\sum_{(l,k') \in P_k} Y(l, k')X(l, k')^H\right]$$

where X(l, k'), (l, k')∈$P_k$, represents the pilot signals at the sender and Y(l, k'), (l, k')∈$P_k$, represents the received signal vector at the receiver, which includes both pilot signals and jamming signals. After computing the BJM filter P(k), the $\hat{X}=P(k)^H Y$ formula is used to decode the desired signals on each subcarrier of all the OFDM symbols in the frame. In some embodiments, legacy short training field 704 may have two orthogonal frequency divisional multiplexing (OFDM) symbols and the legacy long training field 706 has two identical OFDM symbols, which are used for synchronization and channel estimation by the JrRx device.

In some embodiments, the JrRx device is depicted as enabling legitimate communications in a Wi-Fi MIMO network with one or multiple jamming emitters (e.g., as shown in FIG. 1). Further, the operations at the Wi-Fi receivers and the subsequent operations at the Wi-Fi transmitters are presented. Collectively, these operations constitute an anti-jamming scheme that enables jamming-resistant communications in a network environment.

In some embodiments, the disclosed subject matter is configured to conduct jamming mitigation at a wireless receiver, e.g., a JrRx device. Although the wireless network has many devices (e.g., access point and user devices), only one of the devices is actively transmitting signals at one moment due to the media access control. Hence, the communication in the wireless network under jamming attacks can be modeled as the jamming problem that is presented in FIG. 4. As described above, each wireless user device (e.g., sender device and receiver device) is assumed to have more antennas than the jammers present. Notably, the JrRx can be configured to successfully decode the signals from the sender in the presence of jamming signals.

In some embodiments, the disclosed subject matter is configured to conduct carrier sensing at the Wi-Fi transmitter or sending device. In a wireless network, a CSMA mechanism is used for media access control. Specifically, if a Wi-Fi device wants to transmit, the transmitting device first conducts carrier sensing to assess whether the channel is idle. If the channel is determined to be idle, the transmitting device will defer and wait for a random amount of time. Otherwise, the transmitting device will use the channel for data transmission.

In some embodiments, a wireless device (e.g., a Wi-Fi device) is configured to conduct carrier sensing in the presence of jamming signals. Considering the robustness of autocorrelation and/or cross correlation of a signal preamble field (e.g., Wi-Fi preamble field) in the presence of jamming, the preamble detection method is employed for carrier sense at each Wi-Fi device. For example, each Wi-Fi device acts as a receiver before transmitting, and uses the information from a synchronization algorithm (e.g., as described above) to assess whether there is a Wi-Fi signal present in the channel. If a Wi-Fi frame was found by the time synchronization algorithm in a given and/or predefined amount of time, then the channel is considered 'busy' (e.g., not idle) and the Wi-Fi device defers and waits for a random amount of time before its next attempt. Otherwise, the channel is considered idle and the Wi-Fi device uses the channel for data transmission.

Figure 8A:
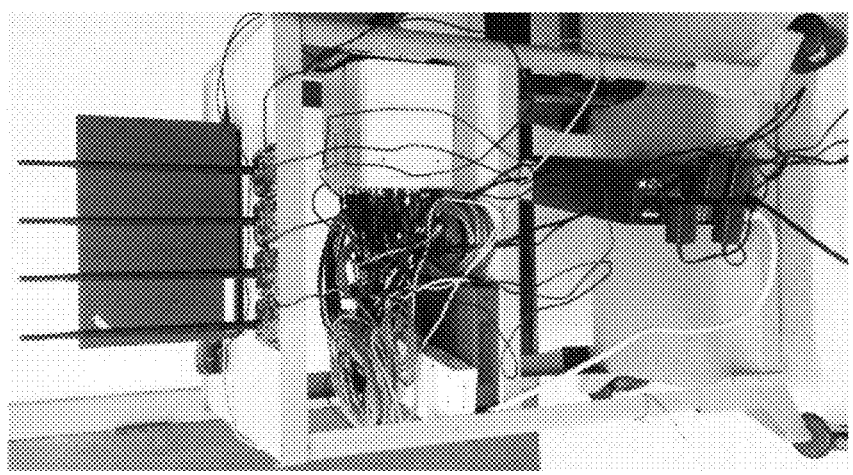
FIG. 8A is an image of an experimental setup in a testing environment according to an embodiment of the subject matter described herein.

FIG. 8A is an image of an experimental setup in a testing environment according to an embodiment of the subject matter described herein. For example, a prototype of the JrRx can be constructed using USRP N210 devices, Octo-Clock-G CDA-2990, a Gigabit-Switch, and a GNURadio software package, as shown in FIG. 8A. Further, a prototype of one sender device using one USRP N210 device and GNURadio has also been similarly constructed. The sender device and the JrRx run a simplified PHY layer of 802.11n in legacy mode using the frame structure 700 depicted in FIG. 7. For example, each OFDM symbol has 64 subcarriers, with 52 of the subcarriers being used for payloads. Further, QPSK modulation can be used for data transmission. Due to the hardware limitations, each USRP N210 at the sender device and JrRx is configured to span a 5 MHz channel by setting the decimation rate to 20 while the carrier frequency is configured to 2.4 GHz.

Figure 8B:
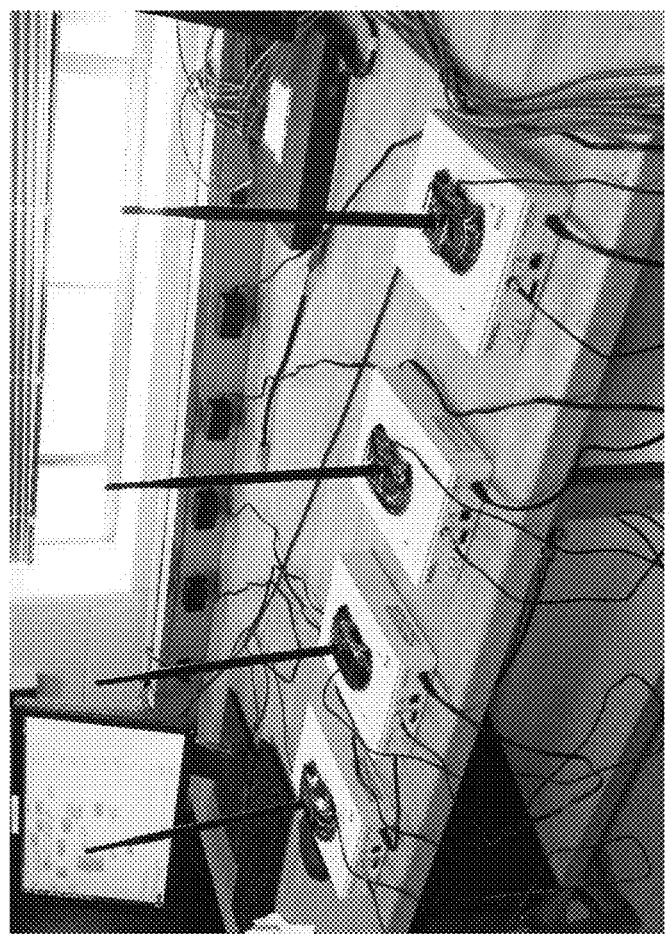
FIG. 8B is an image of the positioning of a sender device and jammer devices in a testing environment according to an embodiment of the subject matter described herein.

In some embodiments, a prototype of three jammers using three USRP N210 devices and GNURadio is built. The waveform, spectrum, and power of each jammer device's radio signal can be configured as needed. For example, FIG. 8B is an image 800 of the positioning of a sender device and jammer devices in a testing environment according to an embodiment of the subject matter described herein. More specifically, the sender device and the three jammer device are shown in FIG. 8B.

Figure 8C:
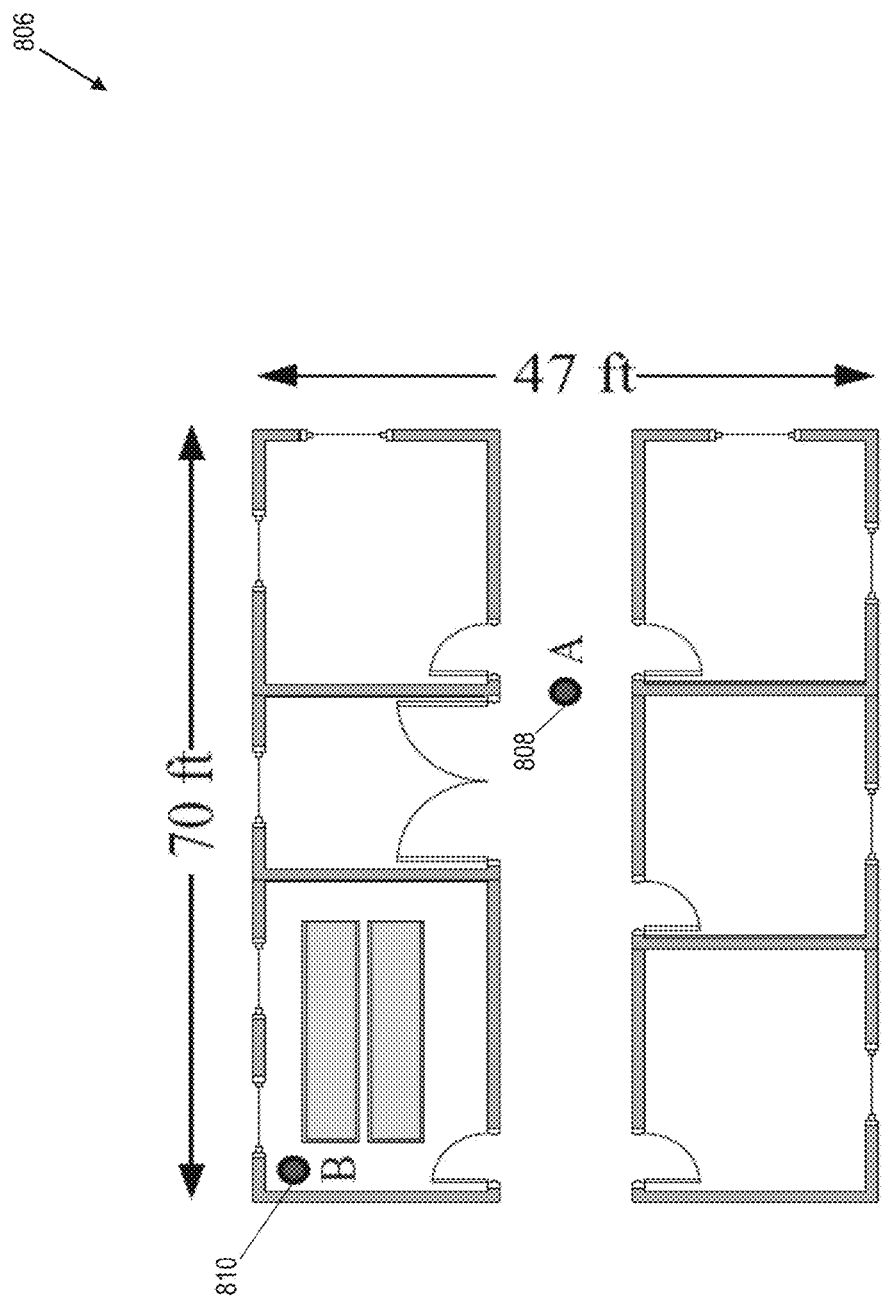
FIG. 8C is block diagram of an experimental setup in a testing environment according to an embodiment of the subject matter described herein.
Figure 9A:
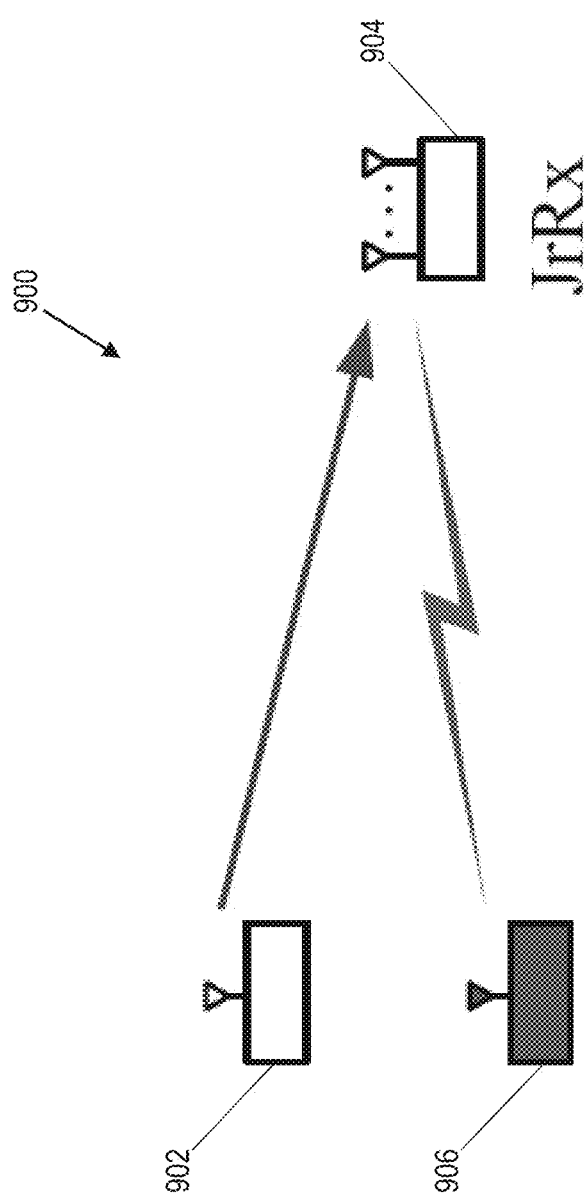
FIG. 9A is a block diagram illustrating an exemplary signal jamming model involving a single jamming device in a multiple-input and multiple-output (MIMO) environment according to an embodiment of the subject matter described herein.
Figure 9B:
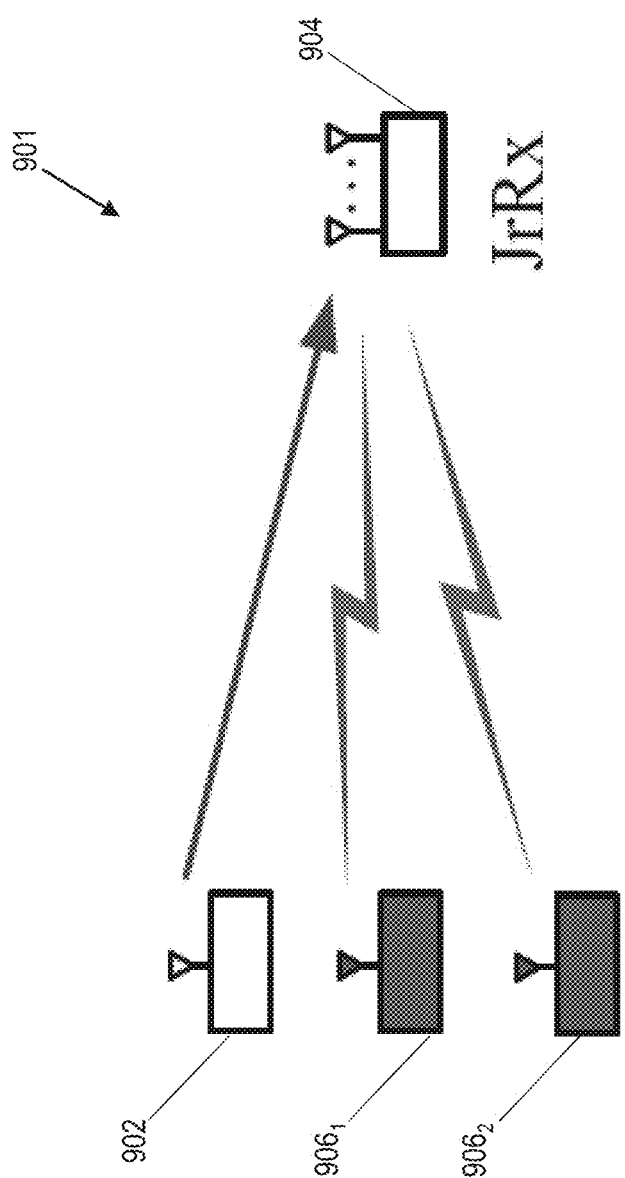
FIG. 9B is a block diagram illustrating an exemplary signal jamming model involving a pair of jamming devices in a multiple-input and multiple-output (MIMO) environment according to an embodiment of the subject matter described herein.
Figure 9C:
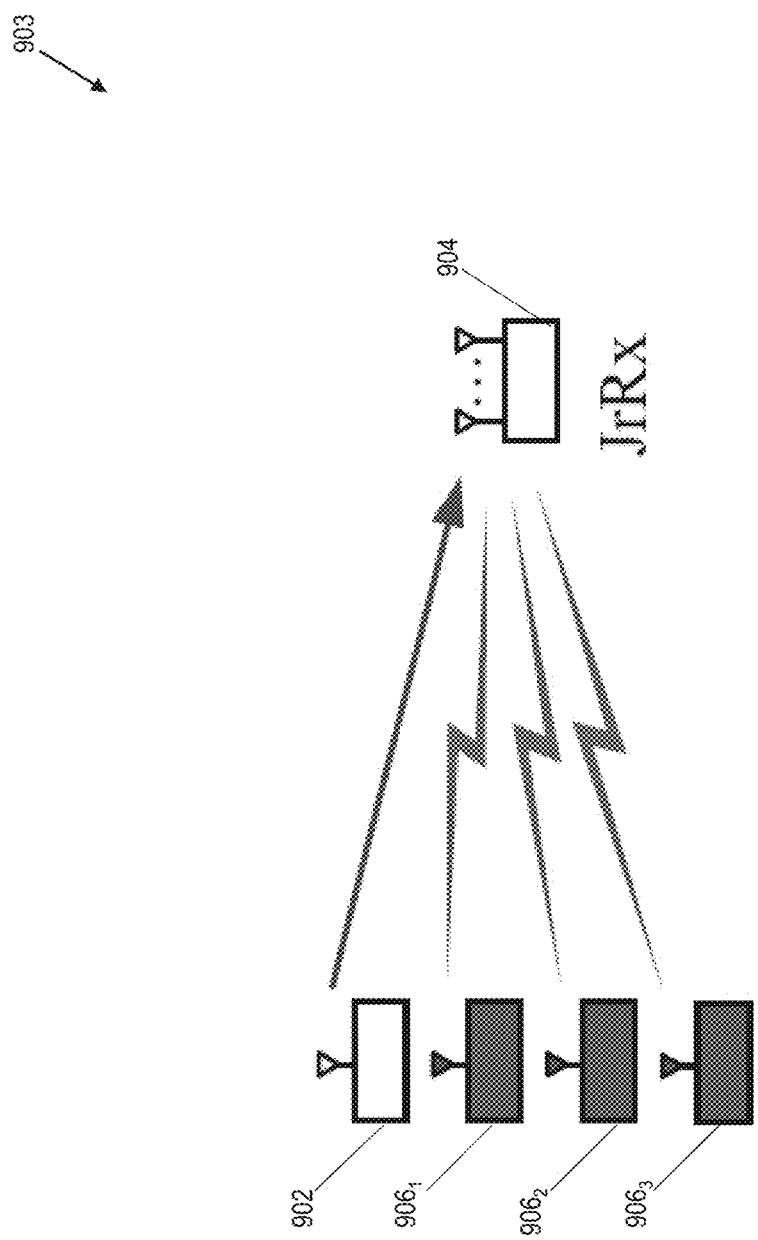
FIG. 9C is a block diagram illustrating an exemplary signal jamming model involving three jamming devices in a multiple-input and multiple-output (MIMO) environment according to an embodiment of the subject matter described herein.

In some experimental scenarios, the performance of JrRx is evaluated in three cases as shown in FIGS. 9A-9C. In each case, the sender device and jammer devices are placed at location "A" and the receiver device (JrRx device) is placed at location "B" in the example floor layout 806 shown in FIG. 8C. Specifically, FIG. 8B shows a photograph of an example physical placement of the sender device and the jammer devices at location "B" as indicated in floor layout 806. As shown, the jammers devices can be placed closely to the sender device. Such a placement and configuration leads to one of the most destructive jamming attacks.

In some embodiments, the sender device's transmit power is fixed to 0 dBm and each jammer device's power can be adjusted from 0 dBm to 20 dBm. Notably, the spectrum of jamming signals fully covers that of the legitimate signals.

In some embodiments, various performance metrics can be used. For example, the post signal-to-jamming-plus-noise ratio (pSJNR) can be used as the performance metric to assess the performance of the JrRx. Mathematically, pSJNR=$10 \log_{10}(E(|X|^2)/E(|X-\hat{X}|^2))$, where X is the original signal at the sender and $\hat{X}$ is the estimated signal at the JrRx. Once the pSJNR is measured at the JrRx, the Raw-BER (e.g., BER without channel code) of the QPSK data transmission can be inferred by Raw-BER=$2Q(\sqrt{\gamma})-Q^2(\sqrt{\gamma})$, where $Q(\bullet)$ is a Q-function and $\gamma$ is the linear value of $$pSJNR\left(e.g., \gamma = 10^{\frac{pSJNR}{10}}\right).$$

In real-world wireless systems (e.g., Wi-Fi and LTE), Raw-BER $10^{-2}$, which corresponds to pSJNR 8.2 dB according to the above formula, is sufficient for the receiver to successfully decode the signal. Therefore, in some embodiments, pSJNR 8.2 dB can be used as the pSJNR threshold of successful data reception at the JrRx device.

As a case study, the performance of JrRx may be explored in the network as shown in FIG. 9A, which is a block diagram illustrating an exemplary signal jamming model involving a single jamming device in a multiple-input and multiple-output (MIMO) environment according to an embodiment of the subject matter described herein. More specifically, FIG. 9A depicts a wireless network 900 that includes a sender device 902, a jammer device 906, and a receiving JrRx device 904. Notably, each of the sender device 902 and jammer device 906 has one antenna and the JrRx device 904 has two antennas. The sender device's transmit power is fixed to 0 dBm and the jammer device's transmit power is set to {0, 10, 20} dBm, respectively.

The performance of the proposed synchronization algorithm can be evaluated in the JrRx device. Recall that the core of the synchronization algorithm includes two jamming-alleviation filters (JAF), e.g., a BJM filter P(0) and a left-singular vector U(i). The impacts of these filters are evaluated on the cross-correlation of the received signals, respectively. In some experiments, the cross-correlation results are obtained by correlating the L-LTF signal with a local L-LTF signal (e.g., preamble signals).

FIG. 9B is a block diagram illustrating an exemplary signal jamming model involving a pair of jamming devices in a multiple-input and multiple-output (MIMO) environment according to an embodiment of the subject matter described herein. More specifically, FIG. 9B depicts a wireless network 901 that includes a sender device 902, jammer devices 9061 and 9062, and a receiving JrRx device 907. Notably, each of the sender device 902 and jammer devices 906 has one antenna and the JrRx device 907 has three (or more) antennas. Although introduced here, FIG. 9B is described in further detail below.

FIG. 9C is a block diagram illustrating an exemplary signal jamming model involving three jamming devices in a multiple-input and multiple-output (MIMO) environment according to an embodiment of the subject matter described herein. More specifically, FIG. 9B depicts a wireless network 903 that includes a sender device 902, jammer devices 9061, 9062, and 9063, and a receiving JrRx device 908. Notably, each of the sender device 902 and jammer devices 906 has one antenna and the JrRx device 908 has four (or more) antennas. Although introduced here, FIG. 9C is described in further detail below.

Figure 10:
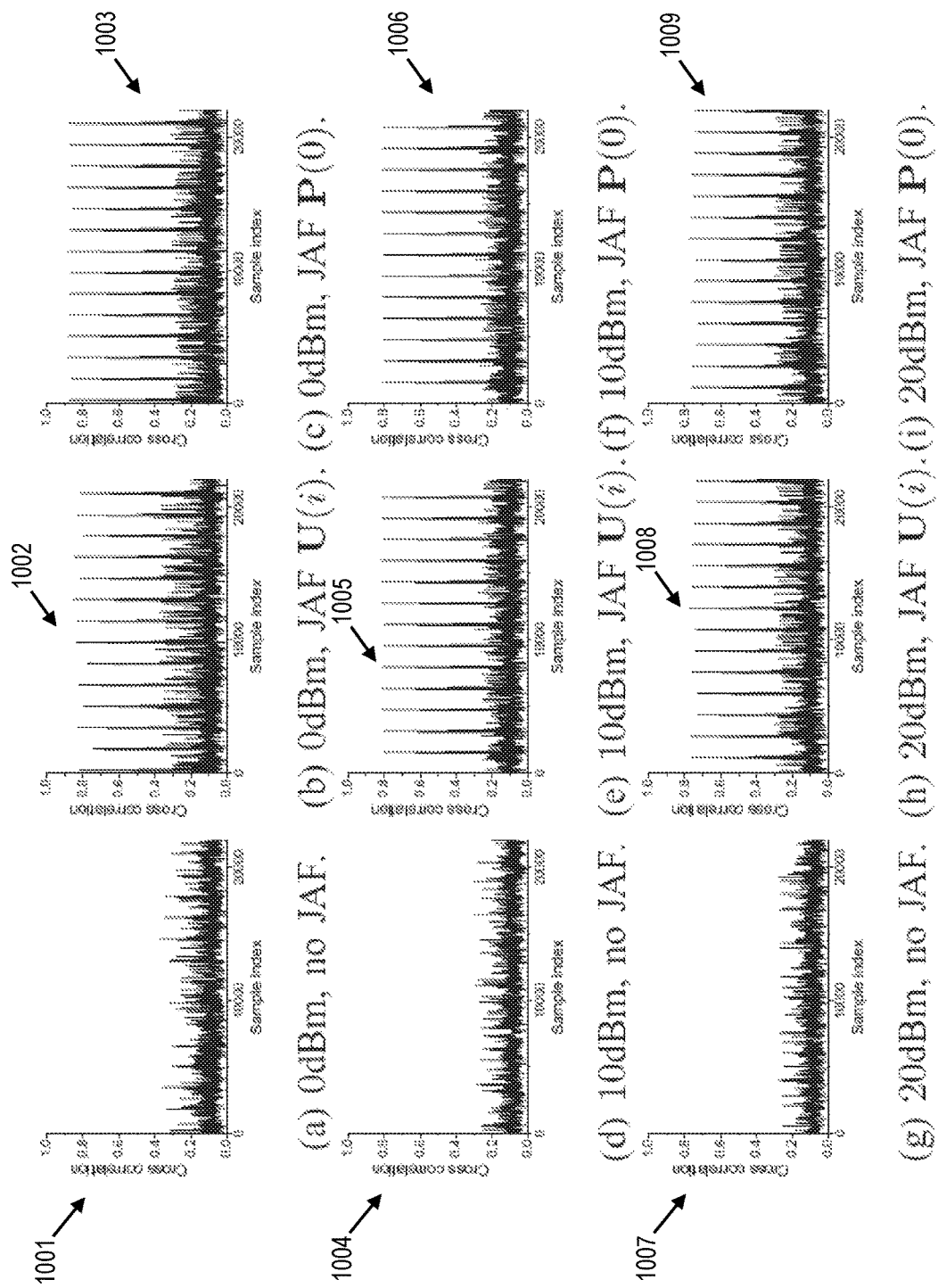
FIG. 10 illustrates a plurality of graphs depicting the performance of two jamming-alleviation filters (JAF) in the synchronization algorithm at various transmitting powers according to an embodiment of the subject matter described herein.

FIG. 10 illustrates a plurality of graphs depicting the performance of two jamming-alleviation filters (JAF) in the synchronization algorithm at various transmitting powers according to an embodiment of the subject matter described herein. More specifically, FIG. 10 presents the impact of the two JAFs on the cross-correlation results of the received signals at the JrRx device. For example, graphs 1001-1003 present the cross-correlation results when the jammer device's transmit power is 0 dBm. Likewise, graphs 1004-1006 present the cross-correlation results when the jammer device's transmit power is 10 dBm. Further, graphs 1007-1009 present the cross-correlation results when the jammer device's transmit power is 20 dBm. Inspecting graphs 1001-1003 in the first row of FIG. 10 when the jammer device's transmit power is 0 dBm, it is evident that (e.g., by comparing graph 1001 and graph 1002) by using left-singular vector U(i) as a JAF can significantly improve the performance of the synchronization algorithm. Comparing graph 1001 and graph 1003, it is further evident that using BJM filter P(0) as JAF can significantly improve the performance of the synchronization algorithm as well. The same phenomenon can be observed in graphs 1004-1006 in the second row (e.g., when the jammer device's transmit power is 10 dBm) and graphs 1007-1009 in the third row of FIG. 10 (e.g., when the jammer device's transmit power is 20 dBm). Based on the above observations, it can be concluded that the proposed synchronization algorithm is able to achieve synchronization in the presence of jamming attacks.

Figure 11A:
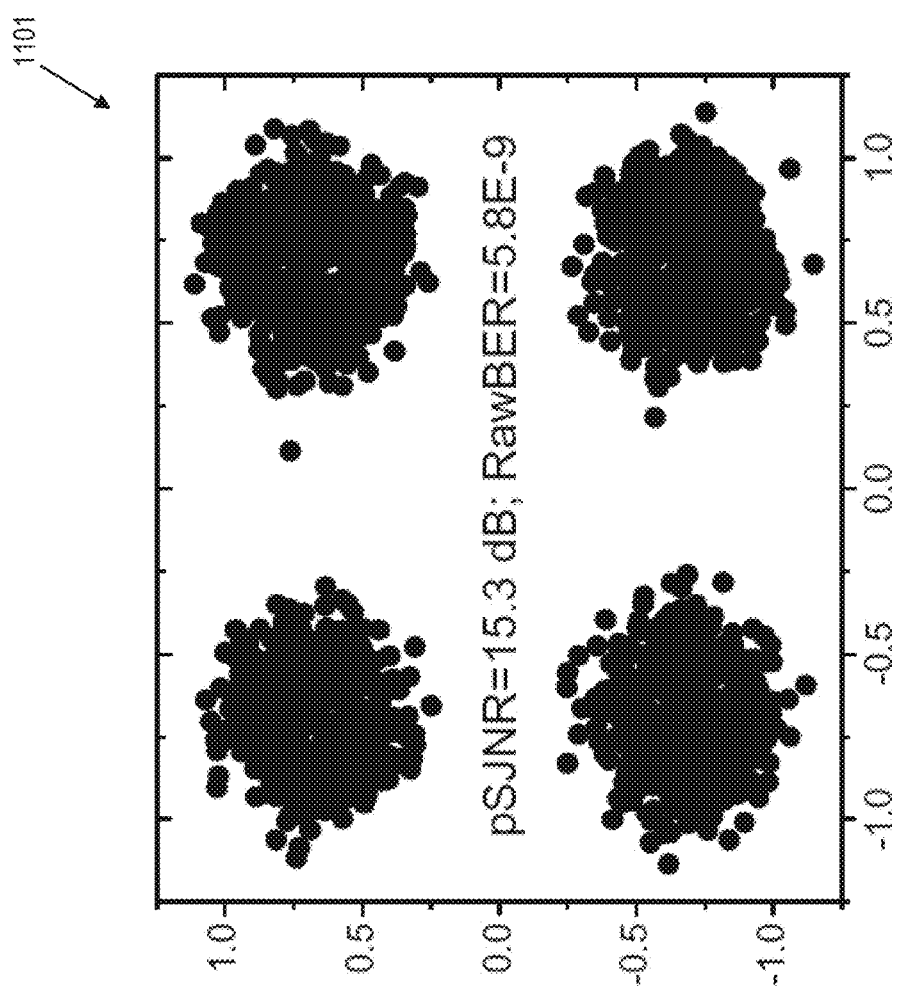
FIGS. 11A-11D illustrate a plurality of constellation diagrams of the decoded symbols at the JrRx device when subjected to different transmit powers from the jammer device according to an embodiment of the subject matter described herein.
Figure 11B:
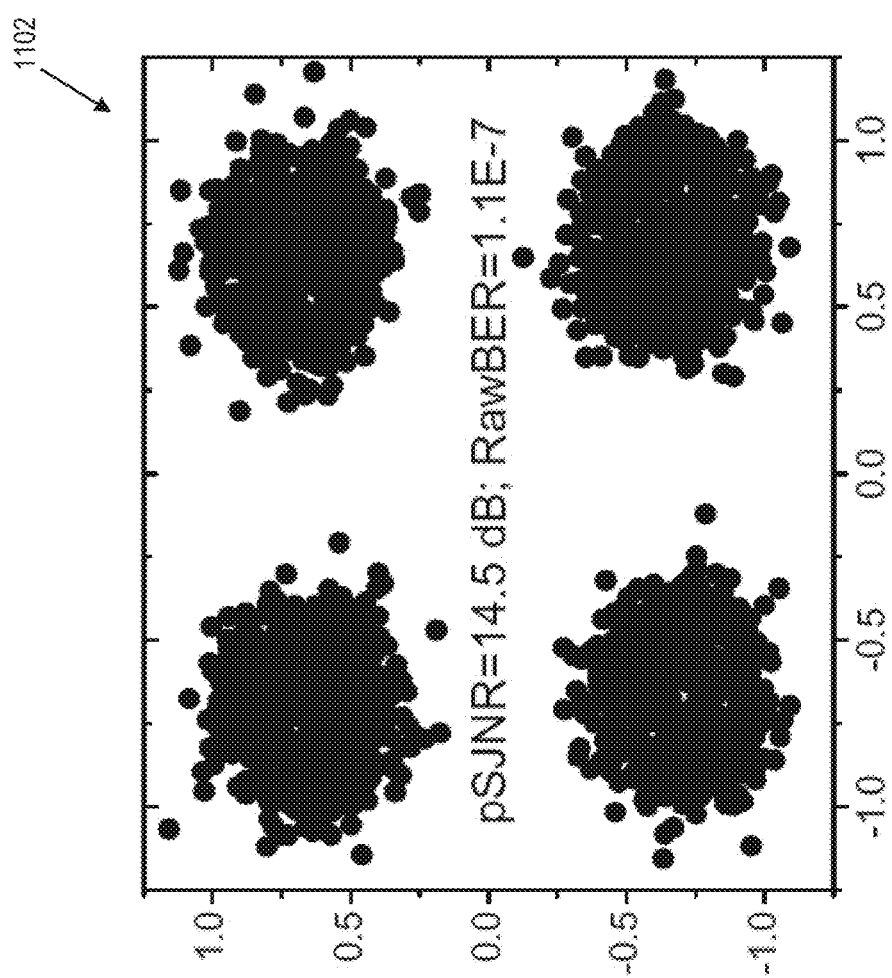
Figure 11C:
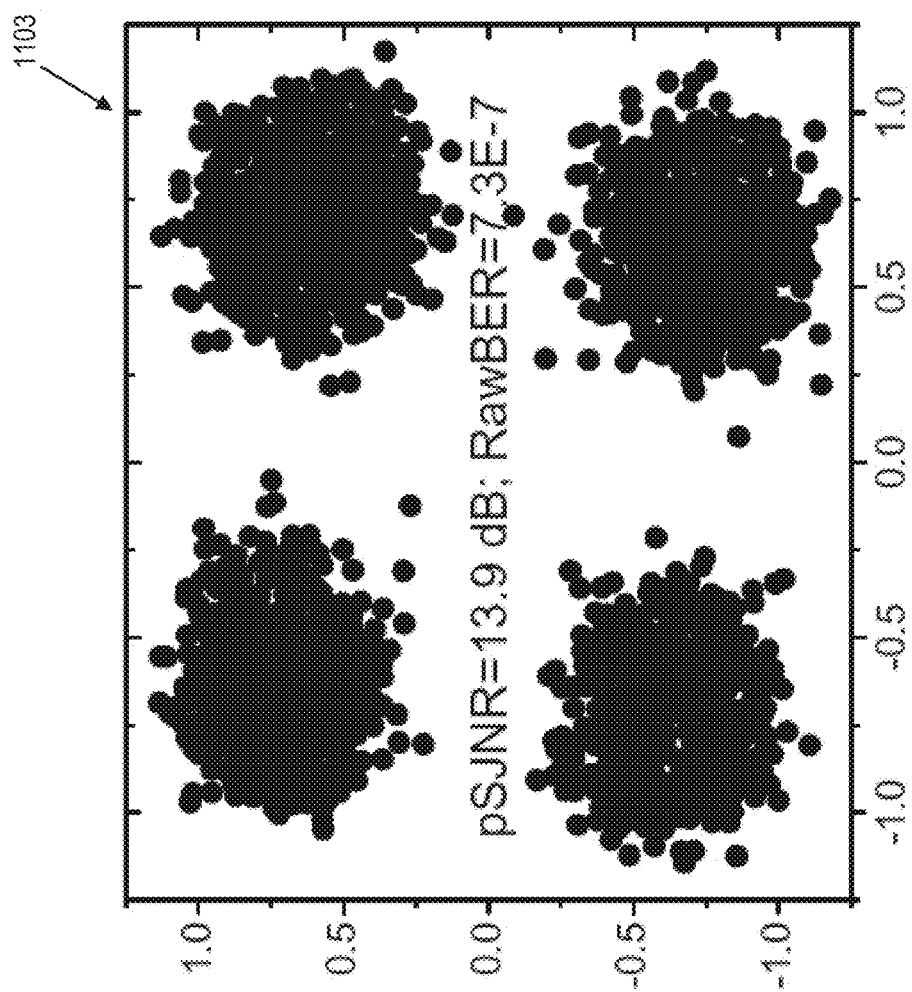
Figure 11D:
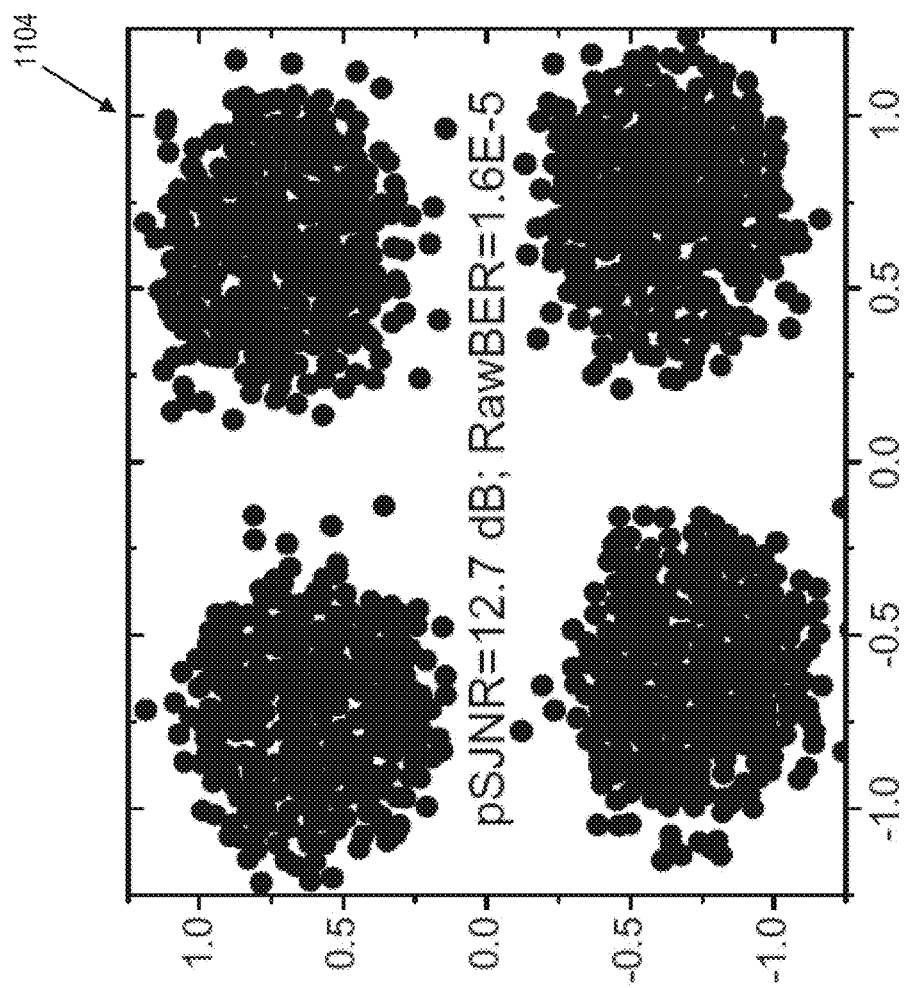

FIGS. 11A-11D illustrate a plurality of constellation diagrams of the decoded symbols at the JrRx device when subjected to different transmit powers from the jammer device according to an embodiment of the subject matter described herein. In some instances, the performance of BJM Algorithm in the JrRx device can be evaluated. FIGS. 11A-11D present the constellation diagram of the decoded symbols at the JrRx. For example, FIG. 11A presents the constellation diagram 1101 when there is no jamming attack present. In this scenario, the pSJNR is 15.3 dB, which corresponds to Raw-BER 5.8E-9. FIG. 11B presents the constellation diagram 1102 when the jammer device's transmit power is 0 dBm. In this case, the pSJNR is 14.5 dB, which corresponds to Raw-BER 1.1E-7. FIG. 11C presents the constellation diagram 1103 when jammer device's transmit power is 10 dBm. In this case, the pSJNR is 13.9 dB, which corresponds to Raw-BER 7.3E-7. FIG. 11D presents the constellation diagram 1104 when jammer device's transmit power is 20 dBm. In this case, the pSJNR is 12.7 dB, which corresponds to Raw-BER 1.6E-5. Comparing constellation diagram 1104 to constellation diagram 1101, it is evident that the pSJNR degradation is less than 3 dB when the jamming signal is 20 dB stronger than the desired signal. This indicates the robustness of the disclosed BJM algorithm.

Figure 12:
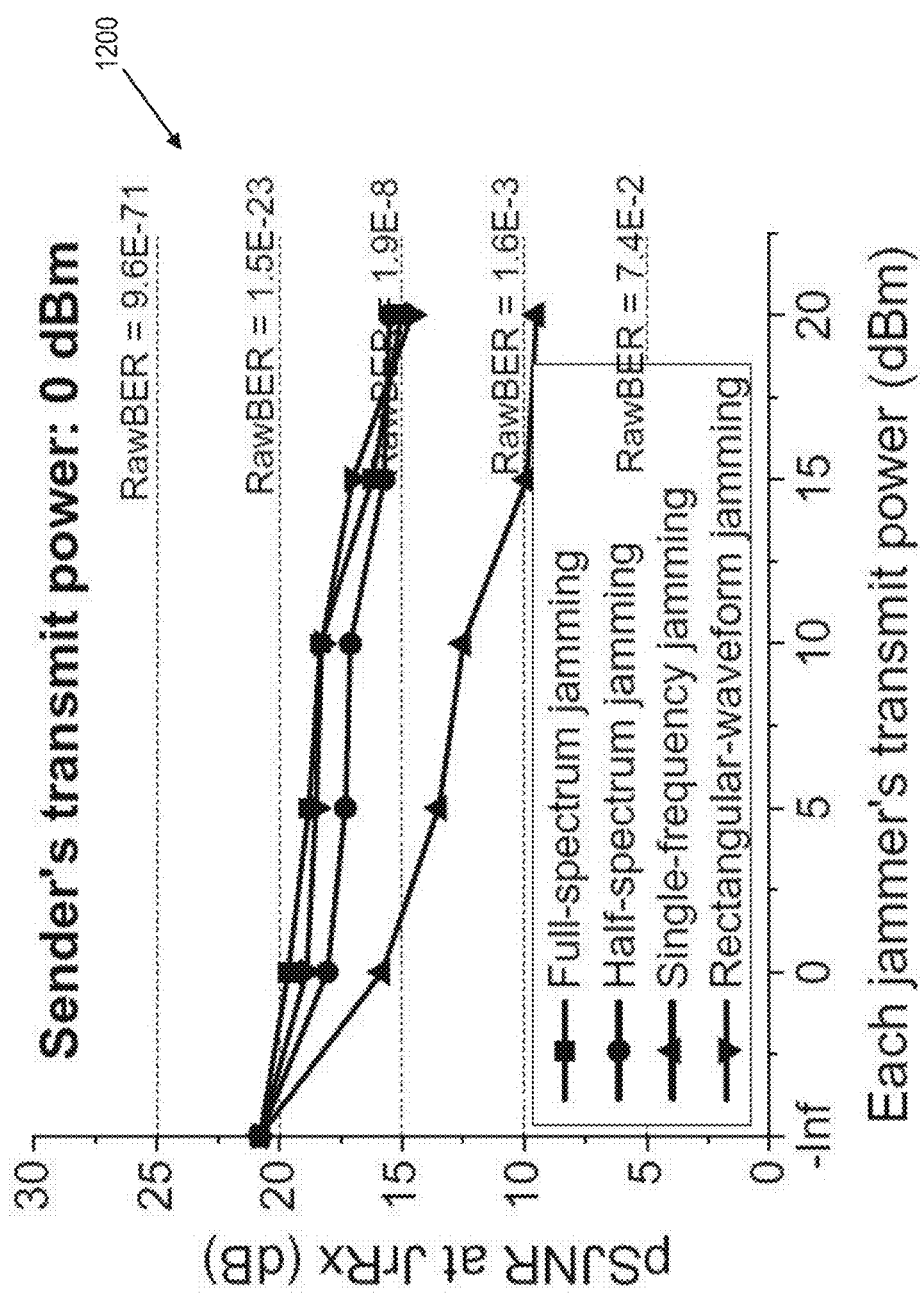
FIG. 12 illustrates a graph depicting the impact of jamming signal waveforms on the performance of a JrRx device according to an embodiment of the subject matter described herein.

In some instances, the impact of jamming waveforms can be evaluated. For example, the destructiveness of different jamming waveforms in the networks (e.g., networks 900, 901 and 903) as shown in FIGS. 9A-9C can be examined. In this experimental scenario, four jamming attacks are considered, including (i) a full-spectrum jamming attack, (ii) a half-spectrum jamming attack, (iii) a single-frequency jamming attack (e.g., a cosine jamming signal), and (iv) a rectangular-waveform jamming attack (e.g., sinc-shaped jamming spectrum). FIG. 12 presents a graph 1200 that illustrates the performance of the JrRx device under these four types of jamming attacks. It is evident that the pSJNR at the JrRx device is greater than 8.2 dB and thus the JrRx device can successfully decode the desired signal under the four jamming attacks. By inspecting FIG. 12, another observation can be made. Notably, the single-frequency jamming attack is the most destructive attack among the four indicated jamming attacks. Raw experimental data has been analyzed and has indicated that the destructiveness of single-frequency jamming attack is attributed to its adverse effect on the frequency synchronization (e.g., estimating the frequency offset at the JrRx device). Namely, when the jamming signal is a strong cosine waveform, the JrRx device can have difficulty to accurately estimate the frequency offset. Accordingly, the pSJNR degrades accordingly.

Figure 13:
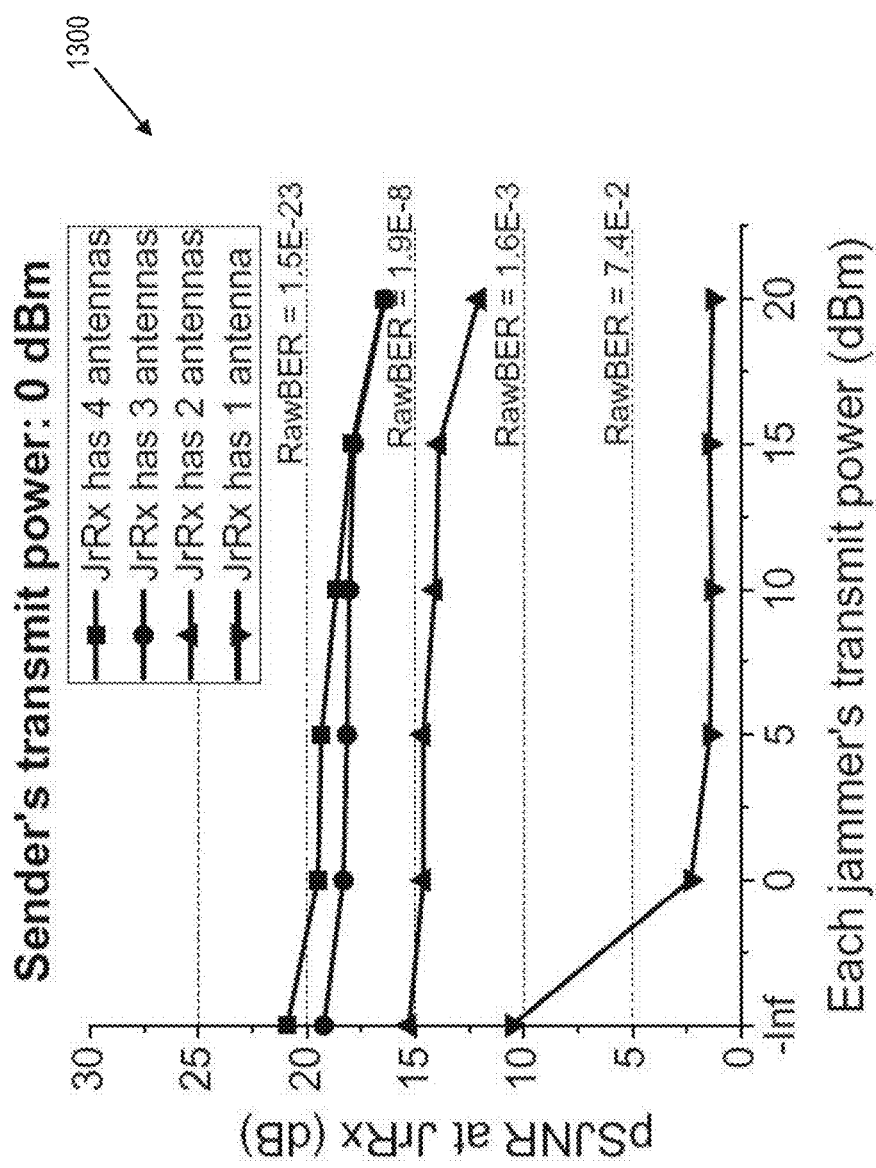
FIG. 13 illustrates a graph depicting the impact of jamming power from one jamming device on the performance of a JrRx device according to an embodiment of the subject matter described herein.

The performance of the JrRx device can be examined under different jamming powers in the three cases as shown in FIGS. 9A-9C. For example, in some embodiments involving a single jammer device, graph 1300 in FIG. 13 illustrates the experimental results that were measured in the network with one jammer device (as shown in FIG. 9A). In graph 1300 of FIG. 13, "–Inf" on x-axis indicates that the network has no jamming signal. From the experimental results, it is evident that when the JrRx device has two or more antennas, the JrRx device successfully decodes the desired signal from the sender device (e.g., pSJNR≥8.2 dB). When the jamming power from –Inf is increased to 20 dBm, the pSJNR degradation at the JrRx device is less than 5 dB. This indicates the robustness of the BJM algorithm in the JrRx device.

Figure 14:
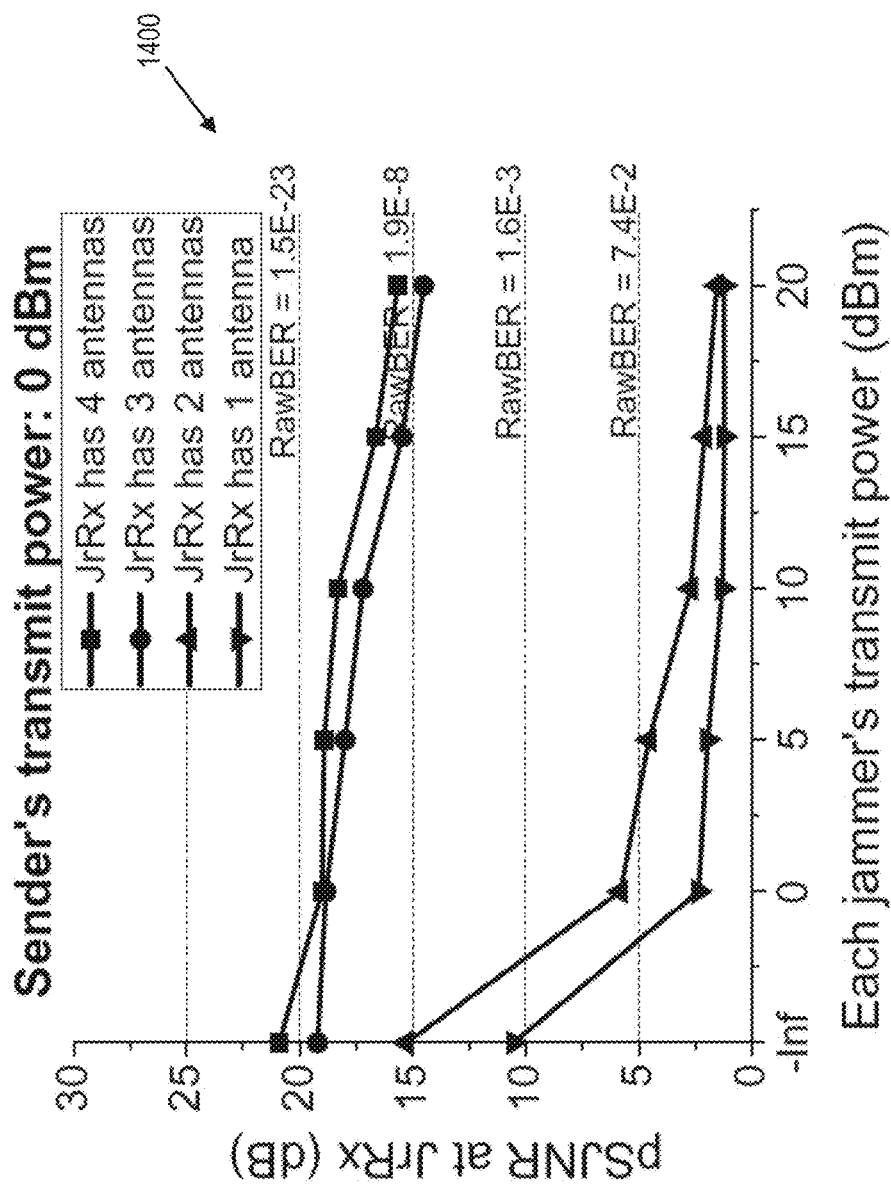
FIG. 14 illustrates a graph depicting the impact of jamming power from two jamming devices on the performance of a JrRx device according to an embodiment of the subject matter described herein.

Similarly, graph 1400 in FIG. 14 presents the experimental results that were measured in the network with two jammer devices (as shown FIG. 9B). Since there are two jammer devices in the network, the total jamming power amounts to the sum of the signal power from the two jammer devices. It is evident that when the JrRx device has three or more antennas, the JrRx device can successfully decode the desired signal from the sender device (e.g., pSJNR≥8.2 dB), even if the jamming signal is 20 dB stronger than the desired signal.

Figure 15:
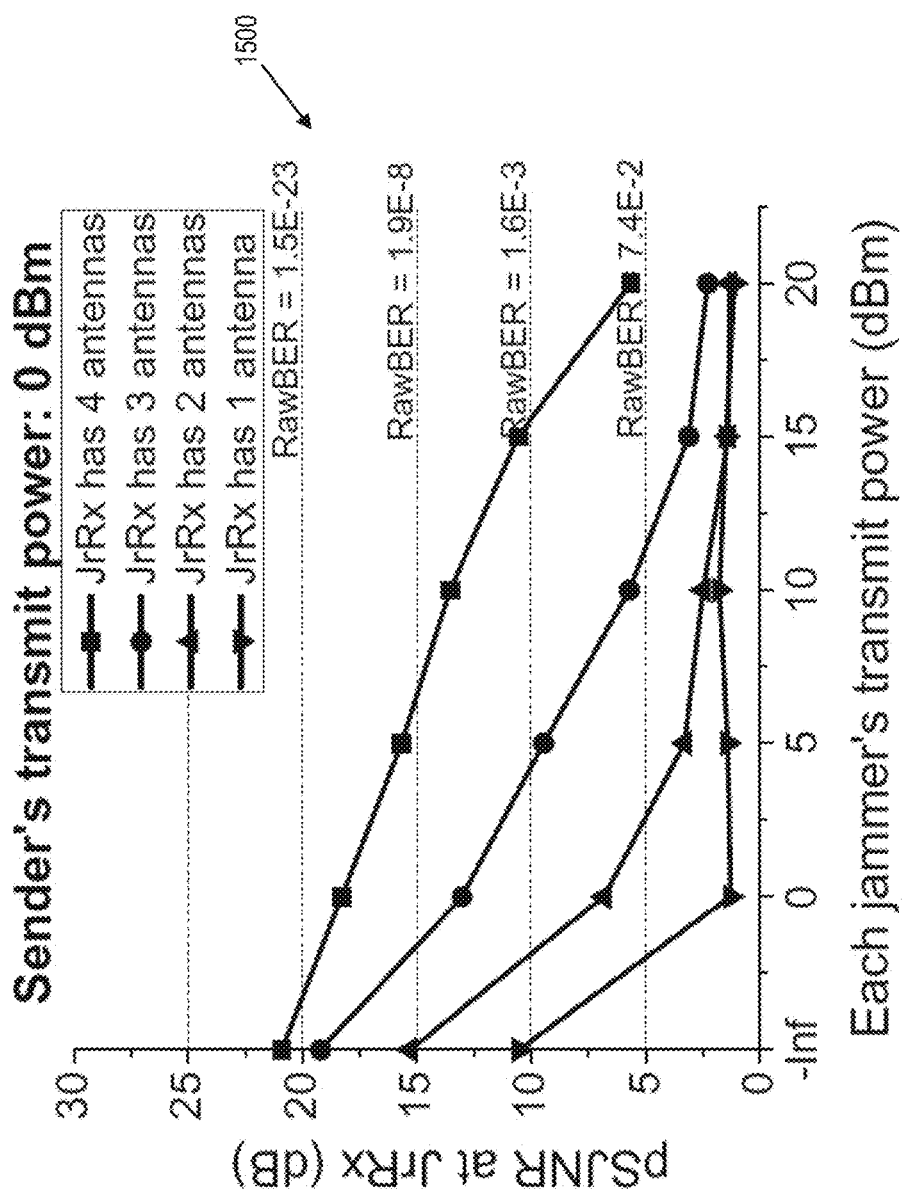
FIG. 15 illustrates a graph depicting the impact of jamming power from three jamming devices on the performance of a JrRx device according to an embodiment of the subject matter described herein.

Further, graph 1500 of FIG. 15 presents the experimental results that were measured in the network with three jammers devices (as shown in FIG. 9C). It is evident that when the JrRx device has four antennas, the JrRx device successfully decodes the desired signal from the sender (e.g., pSJNR≥8.2 dB), even if the jamming signal from each jammer device is 17 dB stronger than the desired signal. Note that there are three jammer devices in the network so there is an additional 4.8 dB for the total jamming power.

Observations may be summarized based on the experimental results. For the conventional receiver, the receiver device cannot successfully decode the desired signal when the jamming signal has similar or larger power than the desired signal. In contrast, the disclosed JrRx device is capable of successful decoding the desired source signal, as long as the JrRx device has more antennas than the jammers, even if the jamming signals are 20 dB stronger than the desired source signals.

The disclosed subject matter describes the first practical anti-jamming solution that can address multiple high-power and broadband jamming attackers in wireless MIMO networks. The core of the solution is the JrRx device, which has two key components: i) a jamming-resilient synchronization algorithm and ii) a BJM algorithm. In some embodiments, the BJM algorithm can mitigate jamming signals without the need of any channel information. Further, the synchronization algorithm can accomplish timing and frequency synchronization in the presence of strong jamming. Experimental results show that (i) the JrRx device is robust to various jamming signals (e.g., full-spectrum jamming, half-spectrum jamming, single-frequency jamming, and rectangular-waveform jamming) and (ii) as long as the JrRx device has more antennas than the jammers, it can successfully decode the signals from the sender, even in the scenarios where the jamming signals are 20 dB stronger than the desired signals.

Figure 16:
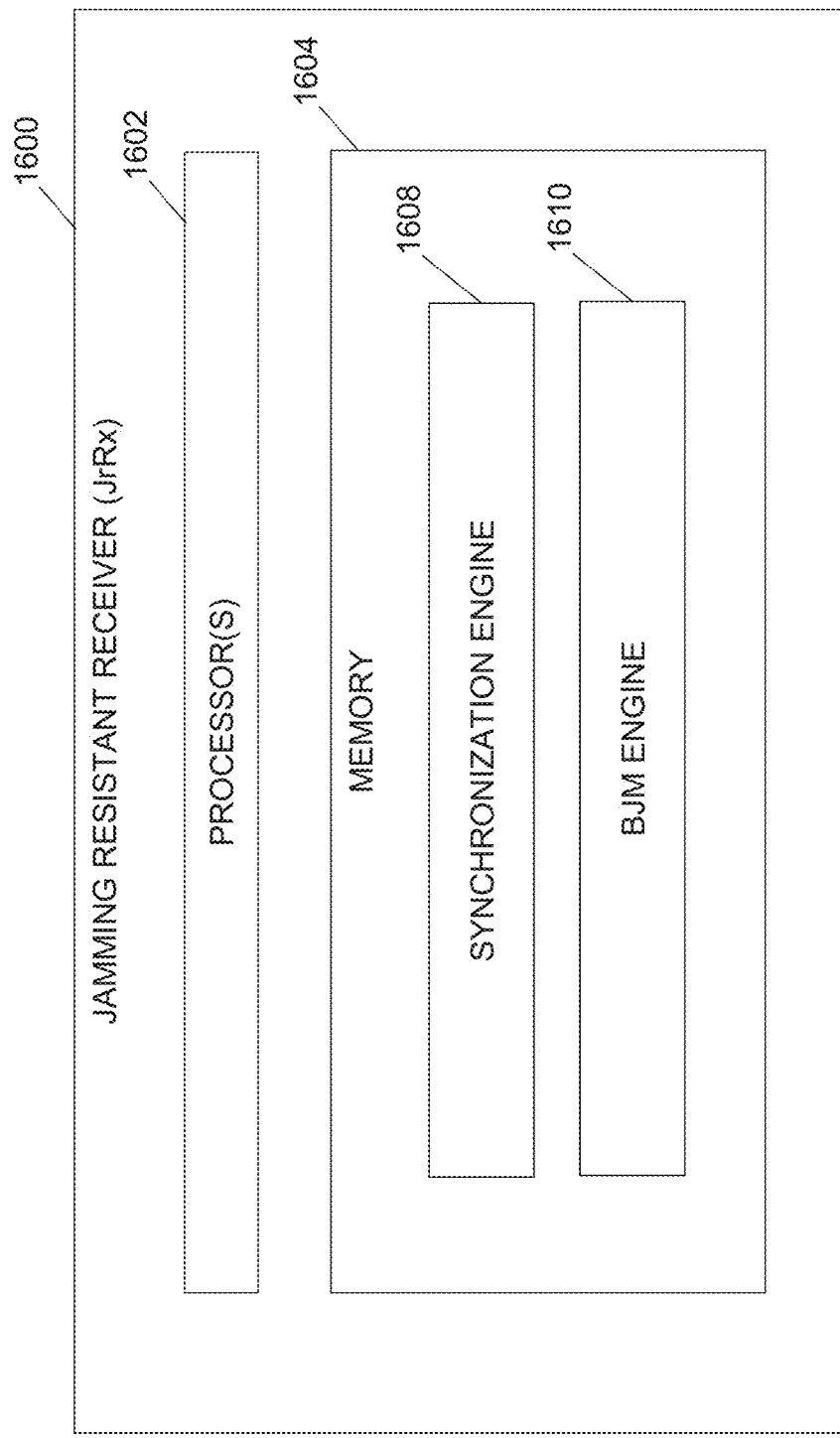
FIG. 16 is a block diagram of an exemplary jamming resistant receiver device according to an embodiment of the subject matter described herein.

FIG. 16 is a block diagram illustrating an exemplary JrRx device 1600 according to an embodiment of the subject matter described herein. As shown in FIG. 16, JrRx device 1600 may include one or more processors 1602, such as a central processing unit (e.g., a single core or multiple processing cores), a microprocessor, a microcontroller, a network processor, an application-specific integrated circuit (ASIC), or the like. JrRx device 1600 may also include memory 1604. Memory 1604 may comprise random access memory (RAM), flash memory, a magnetic disk storage drive, and the like. In some embodiments, memory 1604 may be configured to store a synchronization engine 1608 and blind jamming mitigation engine 1610. Notably, synchronization engine 1608 stored in memory 1604 can perform various synchronization, frame splitting, and/or offset correction functionalities for JrRx device 1600 when executed by one or more processors 1602. Likewise, BJM engine 1610 stored in memory 1604 can perform various jamming alleviation and signal jamming and/or canceling functionalities for JrRx device 1600 when executed by one or more processors 1602.

Figure 17:
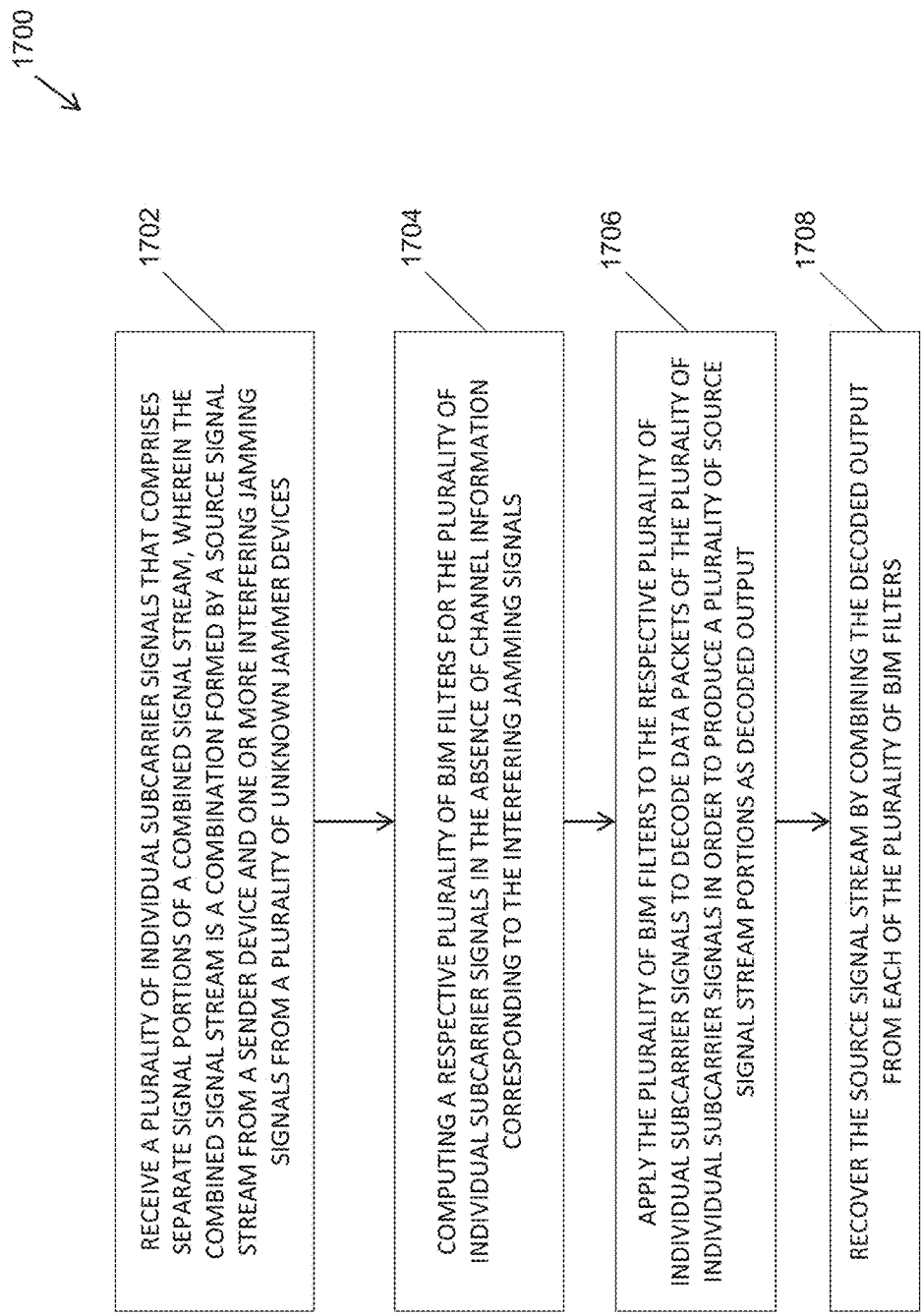
FIG. 17 is a flow chart depicting an exemplary method for utilizing a jamming-resistant receiver device according to an embodiment of the subject matter described herein.

FIG. 17 is a flow chart illustrating an exemplary process or method 1700 for utilizing a jamming-resistant receiver device according to an embodiment of the subject matter described herein. In some embodiments, method 1700 depicted in FIG. 17 is an algorithm stored in memory that when executed by a hardware processor performs one or more of blocks 1702-1708.

In block 1702, method 1700 includes receiving a plurality of individual subcarrier signals that comprises separate signal portions of a combined signal stream, wherein the combined signal stream is a combination formed by a source signal stream from a sender device and one or more interfering jamming signals from a plurality of unknown jammer devices. In some embodiments, the plurality of individual subcarrier signals is received by a BJM engine in a JrRx device from a resident FFT module. Notably, the subcarrier signals are the result of processing a combined signal stream by a synchronization engine in the JrRx device as well as subsequent processing by the FFT module.

In block 1704, method 1700 includes computing a respective plurality of BJM filters for the plurality of individual subcarrier signals in the absence of channel information corresponding to the interfering jamming signals In some embodiments, the JrRx device is configured utilize its BJM engine to calculate a BJM filter (e.g., $P=[\Sigma_{l=1}^{L}\tilde{Y}(l)\tilde{X}(l)^{H}]^{\dagger}[\Sigma_{l=1}^{L}\tilde{Y}(l)\tilde{X}(l)^{H}]$) for each of the plurality of subcarriers.

In block 1706, method 1700 includes applying the plurality of BJM filters to the respective plurality of individual subcarrier signals to decode data packets of the plurality of individual subcarrier signals in order to produce a plurality of source signal stream portions as decoded output. In some embodiments, the BJM engine in the JrRx device provides the plurality of subcarriers as input to the respective plurality of BJM filters and obtains decoded data packets corresponding to different portions of the original source signal stream as output.

In block 1708, method 1700 includes recovering the source signal stream by combining the decoded output from each of the plurality of BJM filters. In some embodiments, the JrRx device and/or the BJM engine is configured to combine the decoded data packets to recreate the original source signal stream transmitted by the legitimate sender device.

Advantages of the subject matter described herein include a jamming resistant solution for preserving legitimate wireless communications against constant wideband jamming attacks by leveraging multiple antennas on wireless user devices. In particular, the disclosed jamming mitigation algorithm can cancel the interfering signals from the jammer device(s) and recover the desired signals transmitted from a legitimate sender device. Unlike existing jamming mitigation algorithms that require and rely on the availability of accurate jamming channel ratio information, the disclosed jamming mitigation algorithm does not require any channel information or jamming device information of any kind. Further, the disclosed subject matter also affords a jamming resistant receiver device that can decode data packets from a legitimate transmitter in the presence of interfering signals originating from multiple unknown jammer devices. As such, the jamming resistant receiver device and/or the jamming mitigation algorithm as described herein improves the technological field of wireless device communications by providing a means that is capable of canceling high-powered wideband jamming attacks in a more efficient manner.

Figure 18:
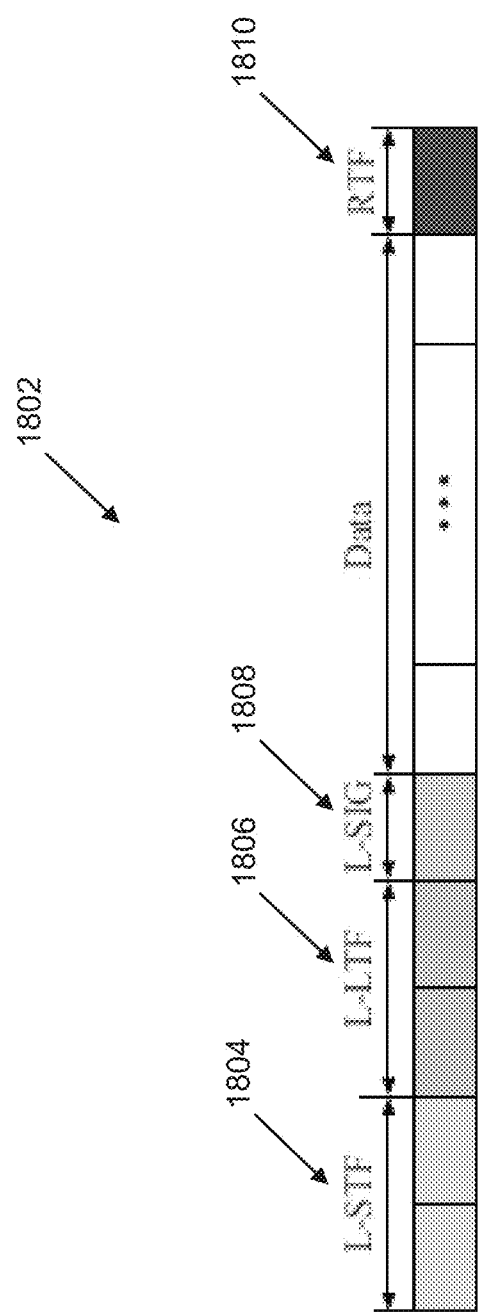
FIG. 18 is a block diagram of an exemplary wireless signal frame format according to an embodiment of the subject matter described herein.

In some embodiments, the disclosed subject matter includes and enhanced PHY design for a wireless receiver that can defend against not only constant jamming attacks but also reactive and proactive high-powered wideband jamming attacks. For example, FIG. 18 illustrates a signal frame format 1802 of an OFDM signal, where L-STF is the legacy short training field 1804, L-LTF is the legacy long training field 1806, and L-SIG is the legacy signal field 1808, and RTF is the rear training field 1810. As used herein, fields 1804-1808 may be referenced as preamble fields. Utilizing this signal frame format, the disclosed subject matter affords a wireless JrRx device that can successfully decode the OFDM signals from the transmitter in the presence of unknown wide-band jamming signals. Notably, the receiver's jamming cancellation capability is 1 to up to 30 decibels.

Figure 19:
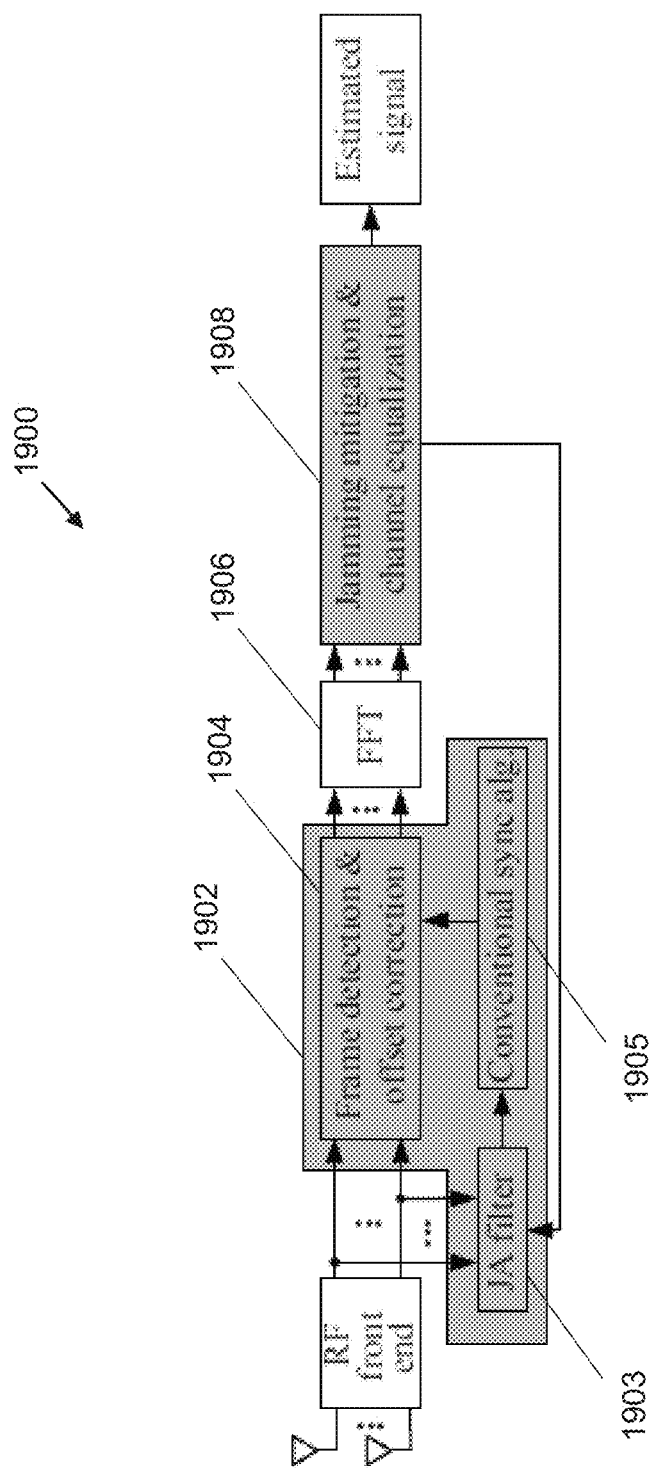
FIG. 19 is a block diagram of an exemplary architecture of a jamming-resistant receiver (JrRx) device according to an embodiment of the subject matter described herein.

FIG. 19 is a block diagram of an exemplary architecture of a jamming-resistant receiver (JrRx) device 1900 according to an embodiment of the subject matter described herein in some embodiments, the JrRx device 1900 may be equipped with a synchronization engine 1902, which is configured with at least two functionalities: timing synchronization functionality and a frequency synchronization functionality. In the context of synchronization engine 1902 of JrRx device 1900, timing synchronization involves the searching for the burst frames by exploiting autocorrelation or cross-correlation up the signal stream in the time domain. Likewise, frequency synchronization conducted by synchronization engine 1902 involves estimating and correcting the frequency offset existing between the transmitter device and the receiver device.

Notably, synchronization in the JrRx device 1900 is a challenging task since the synchronization must be done in the presence of jamming signals. In some embodiments, the synchronization engine 1902 in FIG. 19 includes three components: a spatial jamming alleviation filter 1903 that is used to alleviate the jamming signals for the time domain signal streams, a synchronization algorithm component 1905 that is used to estimate the timing and frequency offsets, and a frame detection and carrier frequency offset correction component 1904. In some embodiments, a jamming alleviation (JA) filter 1903 is a key component in the synchronization engine 1902. Construction of the JA filter 1903 can be achieved through sophisticated manipulations of the jamming migration filter (e.g., JMCE component 1908) and the left singular vectors of the incoming signals.

As shown in FIG. 19, the JrRx device 1900 also includes a jamming migration and channel equalization (JMCE) component 1908. For example, once a radio frame has been found and the frequency offset has been corrected by the synchronization engine 1902, the signal streams are fed to an FFT module 1906, which converts each signal stream from the time domain to frequency domain. For each subcarrier of the resulting frequency domain signals, JrRx device 1900 utilizes a jamming mitigation algorithm to cancel the jamming signals and equalize any channel distortion. Specifically, for each subcarrier, the JrRx device computes a JMCE filter and uses this filter to estimate the original signal. In order to compute the JMCE filters, the JrRx device leverages the reference signals in the L-STF, L-LTF, and RTF fields. Notably, the adaptive jamming mitigation algorithm used to construct the JMCE filter may achieve up to 30 decibels jamming mitigation.

In some embodiments, the JrRx device has been demonstrated to successfully decode a source signal from a transmitting device in the face of unknown jamming attacks. The JrRx device displays the constellation diagram of the decoded video signal from the transmitter and can play the video smoothly. The demonstration participants can control the parameters (e.g., the bandwidth, power, waveform, carrier frequency, etc.) of the jamming signal using the interface control panel. The demonstration participants can also observe the impact of the jamming attacks on the performance of the JrRx device through the constellation diagram and the played video. The demonstration participants may also see that the JrRx device can successfully decode the video signals from the transmitter and play a video stream even if the jamming signal is 20 decibels stronger than the useful signal.

It will be understood that various details of the presently disclosed subject matter can be changed without departing from the scope of the presently disclosed subject matter. Furthermore, the foregoing description is for the purpose of illustration only, and not for the purpose of limitation.

REFERENCES

All references listed in the instant disclosure, including but not limited to all patents, patent applications and publications thereof, scientific journal articles, and database entries are incorporated herein by reference in their entireties to the extent that they supplement, explain, provide a background for, or teach methodology, techniques, and/or embodiments employed herein.

[1] W. Xu, W. Trappe, Y. Zhang, and T. Wood, "The feasibility of launching and detecting jamming attacks in wireless networks," in *ACM MobiHoc*, pp. 46-57, 2005.

[2] W. Shen, P. Ning, X. He, and H. Dai, "Ally friendly jamming: How to jam your enemy and maintain your own wireless connectivity at the same time," in *IEEE Symposium on Security and Privacy*, pp. 174-188, 2013.

[3] M. K. Hanawal, M. J. Abdel-Rahman, and M. Krunz, "Joint adaptation of frequency hopping and transmission rate for anti-jamming wireless systems," *IEEE Transactions on Mobile Computing*, vol. 15, no. 9, pp. 2247-2259, 2016.

[4] W. Xu, T. Wood, W. Trappe, and Y. Zhang, "Channel surfing and spatial retreats: Defenses against wireless denial of service," in *ACM Workshop on Wireless security*, pp. 80-89, 2004.

[5] V. Navda, A. Bohra, S. Ganguly, and D. Rubenstein, "Using channel hopping to increase 802.11 resilience to jamming attacks," in *IEEE INFOCOM*, pp. 2526-2530, 2007.

[6] M. Strasser, C. Popper, S. Capkun, and M. Cagalj, "Jamming-resistant key establishment using uncoordinated frequency hopping," in *IEEE Symposium on Security and Privacy*, pp. 64-78, 2008.

[7] Q. Wang, P. Xu, K. Ren, and X.-Y. Liu, "Delay-bounded adaptive UFH-based anti-jamming wireless communication," in *IEEE INFOCOM*, pp. 1413-1421, 2011.

[8] Y. Liu, P. Ning, H. Dai, and A. Liu, "Randomized differential DSSS: Jamming-resistant wireless broadcast communication," in *IEEE INFO-COM*, pp. 1-9, 2010.
[9] A. Liu, P. Ning, H. Dai, Y. Liu, and C. Wang, "Defending DSSS-based broadcast communication against insider jammers via delayed seed-disclosure," in *ACM ACSAC*, pp. 367-376, 2010.
[10] T. Jin, G. Noubir, and B. Thapa, "Zero pre-shared secret key establishment in the presence of jammers," in *ACM MobiHoc*, pp. 219-228, 2009.
[11] S. Gollakota, F. Adib, D. Katabi, and S. Seshan, "Clearing the RF smog: Making 802.11n robust to cross-technology interference," in *ACM SIGCOMM*, vol. 41, pp. 170-181, 2011.
[12] T. D. Vo-Huu, E.-O. Blass, and G. Noubir, "Counter-jamming using mixed mechanical and software interference cancellation," in *ACM WiSec*, pp. 31-42, 2013.
[13] Q. Yan, H. Zeng, T. Jiang, M. Li, W. Lou, and Y. T. Hou, "Jamming resilient communication using MIMO interference cancellation," *IEEE Transactions on Information Forensics and Security*, vol. 11, no. 7, pp. 1486-1499, 2016.
[14] D. Tse and P. Viswanath, *Fundamentals of wireless communication*. Cambridge university press, 2005.
[15] A. B. Awoseyila, C. Kasparis, and B. G. Evans, "Robust time-domain timing and frequency synchronization for OFDM systems," *IEEE Trans-actions on Consumer Electronics*, vol. 55, no. 2, 2009.
[16] Y.-C. Wu, K.-W. Yip, T.-S. Ng, and E. Serpedin, "Maximum-likelihood symbol synchronization for ieee 802.11a wlans in unknown frequency-selective fading channels," *IEEE Transactions on Wireless Communications*, vol. 4, no. 6, pp. 2751-2763, 2005.
[17] E. Research, "USRP N210," www.ettus.com/product/details/UN210-KIT [Online; accessed 8 Mar. 2017].
[18] E. Blossom, "GNU radio: Tools for exploring the radio frequency spectrum," *Linux journal*, vol. 2004, no. 122, p. 4, 2004.
[19] J. G. Proakis, "Digital communications," McGraw-Hill, New York, 1995.

What is claimed is:

1. A method comprising:
   receiving, by a blind jamming mitigation (BJM) engine in a jamming-resistant receiver (JrRx) device, a plurality of individual subcarrier signals that comprises separate signal portions of a combined signal stream, wherein the combined signal stream is a combination formed by a source signal stream from a sender device and one or more interfering jamming signals from a plurality of unknown jammer devices;
   computing, by the BJM engine, a respective plurality of BJM filters for the plurality of individual subcarrier signals in the absence of channel information corresponding to the interfering jamming signals;
   applying, by the BJM engine, the plurality of BJM filters to the respective plurality of individual subcarrier signals to decode data packets of the plurality of individual subcarrier signals as decoded output, wherein each of the plurality of BJM filters comprises a linear spatial filter that is configured to process pilot signals from the sender device such that information pertaining to the one or more jamming signals or the plurality of unknown jamming devices is unnecessary to generate the decoded output; and
   recovering, by the BJM engine, the source signal stream by combining the decoded output from each of the plurality of BJM filters.

2. The method of claim 1 wherein recovering the source signal stream includes equalizing a channel using the one or more of the plurality of BJM filters to decode the source signal.

3. The method of claim 1 wherein computing one or more of the BJM filters includes determining a plurality of pilot signals or reference signals included in preamble fields of a frame of the source signal stream that originates from the sender device.

4. The method of claim 1 wherein computing one or more of the plurality of BJM filters is conducted when jamming channel information of the one or more interfering jamming signals is unavailable or unknown.

5. The method of claim 1 wherein each of the JrRx device and the sender device includes a number of antennas that exceeds a sum of antennas associated with the plurality of unknown jammer devices.

6. The method of claim 1 wherein the plurality of individual subcarrier signals includes a plurality of frequency divisional multiplexing (OFDM) subcarriers.

7. The method of claim 1 wherein each of the plurality of BJM filters includes a BJM filter that is represented as $P=[\Sigma_{l=1}^{L}\tilde{Y}(l)\tilde{Y}(l)^{H}]^{\dagger}[\Sigma_{l=1}^{L}\tilde{Y}(l)\tilde{Y}(l)^{H}]$, where $(\bullet)^{\dagger}$ is a pseudo-inverse operator, wherein $\tilde{Y}(l)$ represents pilot signals received at the receiver device and $\tilde{X}(l)$ represents pilot signals at the sender device.

8. A jamming-resistant receiver (JrRx) device comprising:
   at least one processor and memory; and
   a blind jamming mitigation (BJM) engine stored in the memory and when executed by the at least one processor is configured for receiving a plurality of individual subcarrier signals that comprises separate signal portions of a combined signal stream, wherein the combined signal stream is a combination formed by a source signal stream from a sender device and one or more interfering jamming signals from a plurality of unknown jammer devices, computing a respective plurality of BJM filters for the plurality of individual subcarrier signals in the absence of channel information corresponding to the interfering jamming signals, applying the plurality of BJM filters to the respective plurality of individual subcarrier signals to decode data packets of the plurality of individual subcarrier signals as decoded output, wherein each of the plurality of BJM filters comprises a linear spatial filter that is configured to process pilot signals from the sender device such that information pertaining to the one or more jamming signals or the plurality of unknown jamming devices is unnecessary to generate the decoded output, and recovering the source signal stream by combining the decoded output from each of the plurality of BJM filters.

9. The JrRx device of claim 8 wherein recovering the source signal stream includes equalizing a channel using one or more of the plurality of BJM filters to decode the source signal.

10. The JrRx device of claim 8 wherein a synchronization engine is configured for determining a plurality of pilot signals or reference signals included in preamble fields of a frame in the source signal stream that originates from the sender device.

11. The JrRx device of claim 8 wherein the BJM engine is further configured for computing a JA filter when jamming channel information of the one or more interfering jamming signals is unavailable or unknown.

12. The JrRx device of claim 8 wherein each of the JrRx device and the sender device includes a number of antennas that exceeds a sum of antennas associated with the plurality of unknown jammer devices.

13. The JrRx device of claim 8 wherein the plurality of individual subcarrier signals includes a plurality of frequency divisional multiplexing (OFDM) subcarriers.

14. The JrRx device of claim 8 wherein each of the plurality of BJM filters includes a BJM filter that is represented as $P=[\sum_{l=1}^{L}\tilde{Y}(l)\tilde{Y}(l)^{H}]^{\dagger}[\sum_{l=1}^{L}\tilde{Y}(l)\tilde{Y}(l)^{H}]$, where $(\bullet)^{\dagger}$ is a pseudo-inverse operator, wherein $\tilde{Y}(l)$ represents pilot signals received at the receiver device and $\tilde{X}(l)$ represents pilot signals at the sender device.

15. A non-transitory computer readable medium having stored thereon executable instructions that when executed by a processor of a computer controls the computer to perform steps comprising:
   receiving, by a BJM engine, a plurality of individual subcarrier signals that comprises separate signal portions of a combined signal stream, wherein the combined signal stream is a combination formed by a source signal stream from a sender device and one or more interfering jamming signals from a plurality of unknown jammer devices;
   computing, by the BJM engine, a respective plurality of BJM filters for the plurality of individual subcarrier signals in the absence of channel information corresponding to the interfering jamming signals;
   applying, by the BJM engine, the plurality of BJM filters to the respective plurality of individual subcarrier signals to decode data packets of the plurality of individual subcarrier signals as decoded output, wherein each of the plurality of BJM filters comprises a linear spatial filter that is configured to process pilot signals from the sender device such that information pertaining to the one or more jamming signals or the plurality of unknown jamming devices is unnecessary to generate the decoded output; and
   recovering, by the BJM engine, the source signal stream by combining the decoded output from each of the plurality of BJM filters.

16. The non-transitory computer readable medium of claim 15 wherein recovering the source signal stream includes equalizing a channel using the one or more of the plurality of BJM filters to decode the source signal.

17. The non-transitory computer readable medium of claim 15 wherein computing one or more of the plurality of BJM filters includes determining a plurality of pilot signals or reference signals included in preamble fields of a frame of the source signal stream that originates from the sender device.

18. The non-transitory computer readable medium of claim 15 wherein computing one or more of the plurality of BJM filters is conducted when jamming channel information of the one or more interfering jamming signals is unavailable or unknown.

19. The non-transitory computer readable medium of claim 15 wherein each of the JrRx device and the sender device includes a number of antennas that exceeds a sum of antennas associated with the plurality of unknown jammer devices.

20. The non-transitory computer readable medium of claim 15 wherein the plurality of individual subcarrier signals includes a plurality of frequency divisional multiplexing (OFDM) subcarriers.

\* \* \* \* \*